(12) United States Patent
Mullet et al.

(10) Patent No.: US 10,246,938 B2
(45) Date of Patent: Apr. 2, 2019

(54) HIGH EFFICIENCY ROLLER SHADE AND METHOD FOR SETTING ARTIFICIAL STOPS

(71) Applicant: The Watt Stopper, Inc., Santa Clara, CA (US)

(72) Inventors: Willis Jay Mullet, Gulf Breeze, FL (US); Yan Rodriguez, Suwanee, GA (US); Ben L. Garcia, Cumming, GA (US); Victoria Baynes Mullet, Gulf Breeze, FL (US); Matthew Warren Kirkland, Cantonment, FL (US)

(73) Assignee: THE WATT STOPPER INC., Santa Clara, CA (US)

( * ) Notice: Subject to any disclaimer, the term of this patent is extended or adjusted under 35 U.S.C. 154(b) by 0 days.

(21) Appl. No.: 15/633,895

(22) Filed: Jun. 27, 2017

(65) Prior Publication Data
US 2017/0292324 A1    Oct. 12, 2017

Related U.S. Application Data

(63) Continuation of application No. 15/203,293, filed on Jul. 6, 2016, now Pat. No. 9,725,948, which is a
(Continued)

(51) Int. Cl.
| | |
|---|---|
| *H02P 1/00* | (2006.01) |
| *H02P 3/00* | (2006.01) |
| *H02P 5/00* | (2016.01) |
| *H02P 7/00* | (2016.01) |
| *E06B 9/72* | (2006.01) |
| *H02P 3/08* | (2006.01) |
| *H02P 3/06* | (2006.01) |
| *E06B 9/42* | (2006.01) |
| *G08C 17/02* | (2006.01) |
| *G08C 23/04* | (2006.01) |
| *E06B 9/60* | (2006.01) |

(Continued)

(52) U.S. Cl.
CPC ............... *E06B 9/72* (2013.01); *E06B 9/42* (2013.01); *E06B 9/44* (2013.01); *E06B 9/60* (2013.01); *E06B 9/62* (2013.01); *E06B 9/68* (2013.01); *E06B 9/74* (2013.01); *G08C 17/02* (2013.01); *G08C 23/04* (2013.01); *H02P 1/06* (2013.01); *H02P 3/06* (2013.01); *H02P 3/08* (2013.01); *E06B 2009/6809* (2013.01); *E06B 2009/6818* (2013.01); *E06B 2009/6845* (2013.01); *E06B 2009/6872* (2013.01); *E06B 2009/6881* (2013.01); *E06B 2009/725* (2013.01); *G08C 2201/50* (2013.01); *G08C 2201/51* (2013.01)

(58) Field of Classification Search
CPC ........................................................ E06B 9/72
USPC ........................................................ 318/255
See application file for complete search history.

(56) References Cited

U.S. PATENT DOCUMENTS

2009/0308543 A1* 12/2009 Kates .................. E06B 9/44
160/5

* cited by examiner

*Primary Examiner* — Erick D Glass
(74) *Attorney, Agent, or Firm* — Christopher A. Proskey; BrownWinick Law Firm

(57) ABSTRACT

The present invention advantageously provides a motorized roller shade that includes a shade tube, a motor/controller unit and a power supply unit. The motor/controller unit is disposed within the shade tube, and includes a bearing, rotatably coupled to a support shaft, and a DC gear motor. The output shaft of the DC gear motor is coupled to the support shaft such that the output shaft and the support shaft do not rotate when the support shaft is attached to the mounting bracket.

21 Claims, 31 Drawing Sheets

Related U.S. Application Data continuation of application No. 14/562,946, filed on Dec. 8, 2014, now Pat. No. 9,410,369, which is a continuation of application No. 14/018,823, filed on Sep. 5, 2013, now Pat. No. 8,947,027, which is a continuation of application No. 13/653,451, filed on Oct. 17, 2012, now Pat. No. 8,575,872, which is a continuation-in-part of application No. 12/711,193, filed on Feb. 23, 2010, now Pat. No. 8,368,328.

(51) Int. Cl.
| | | |
|---|---|---|
| *E06B 9/62* | (2006.01) | |
| *E06B 9/68* | (2006.01) | |
| *E06B 9/44* | (2006.01) | |
| *E06B 9/74* | (2006.01) | |
| *H02P 1/06* | (2006.01) | |

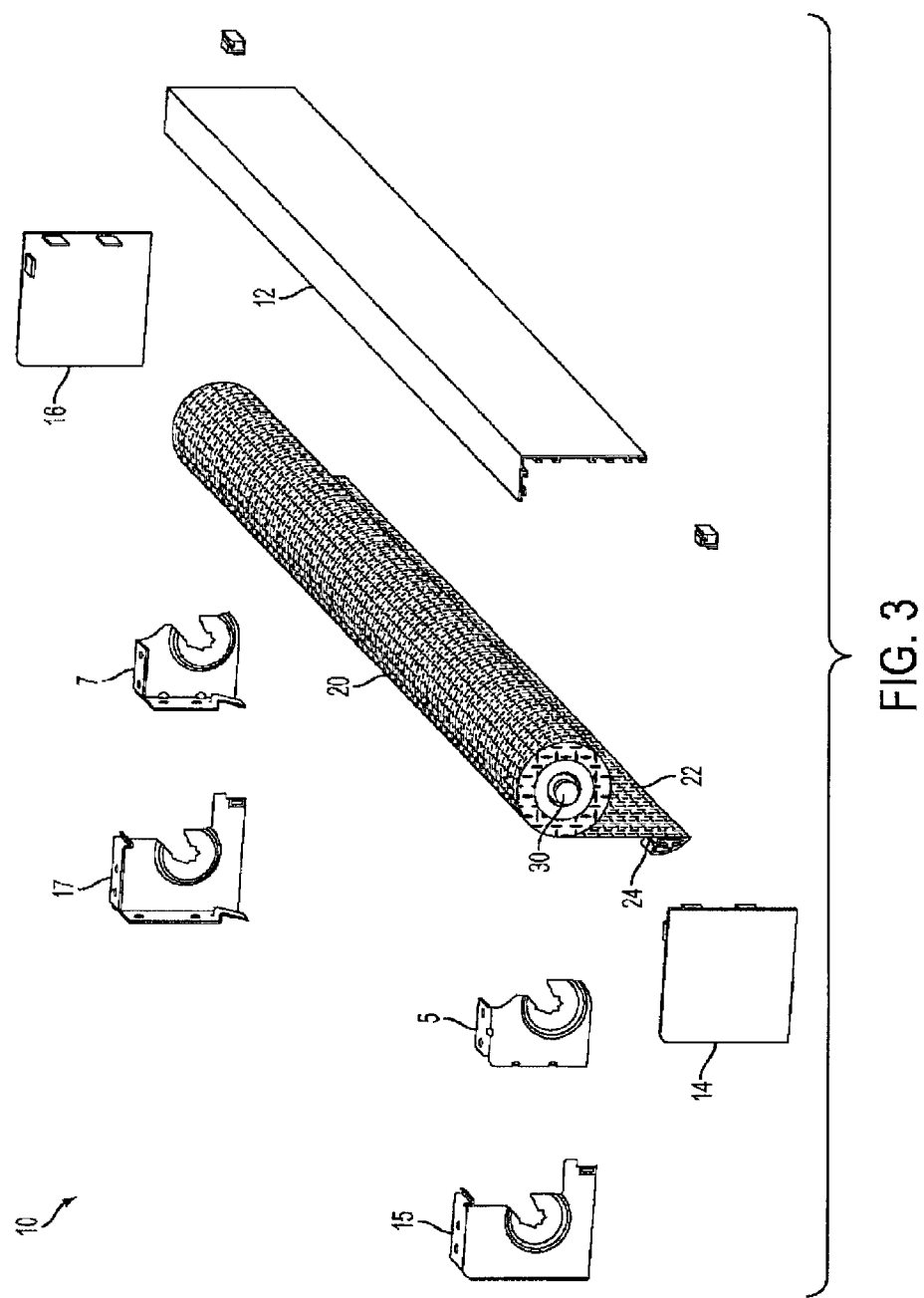

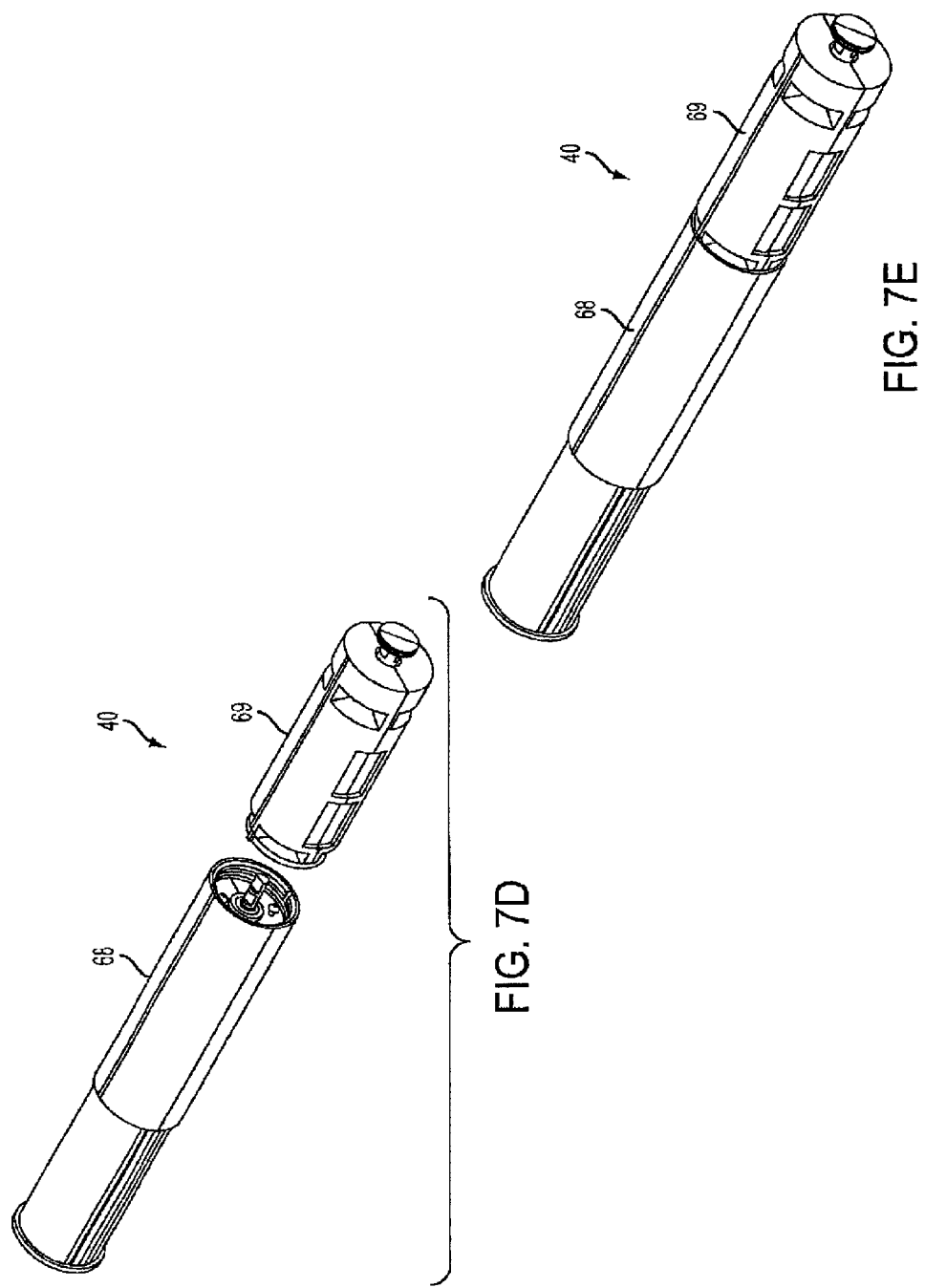

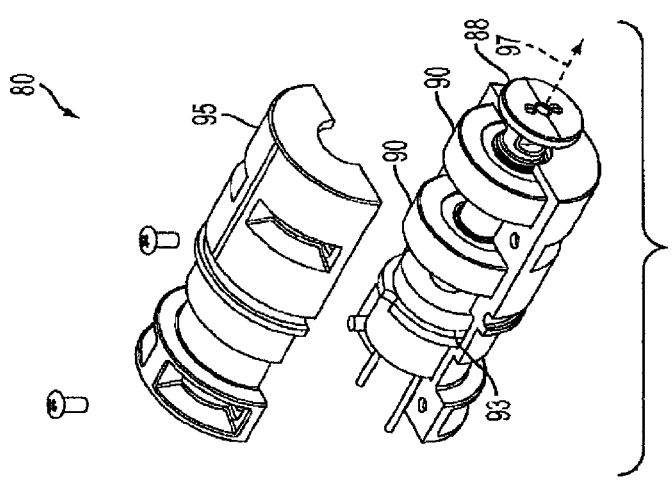
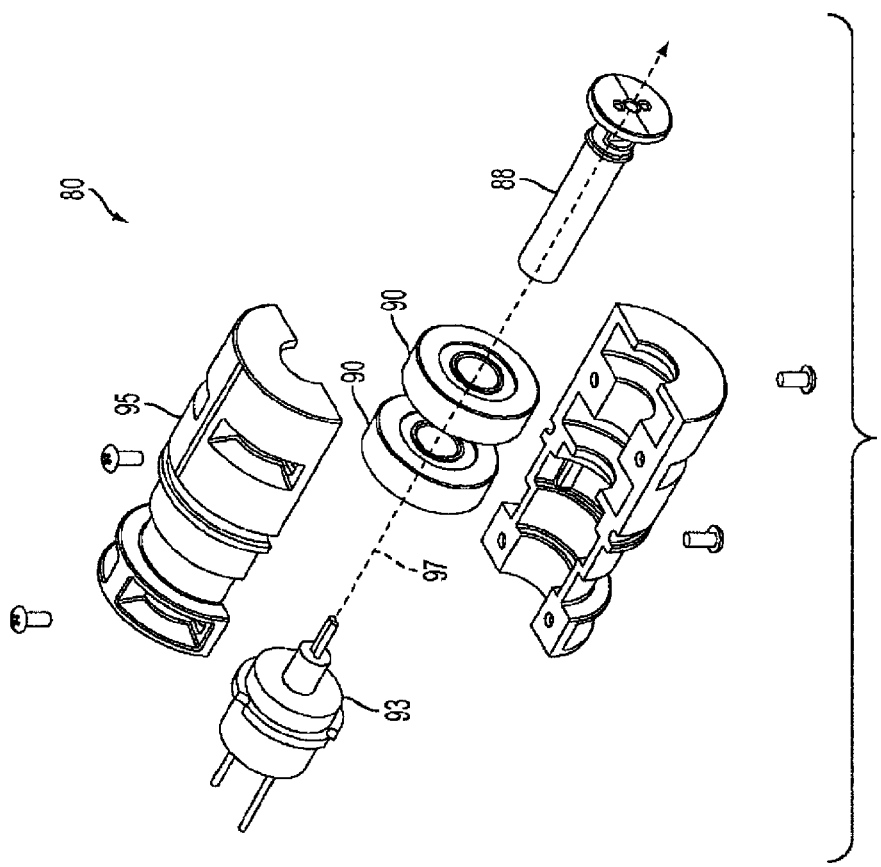

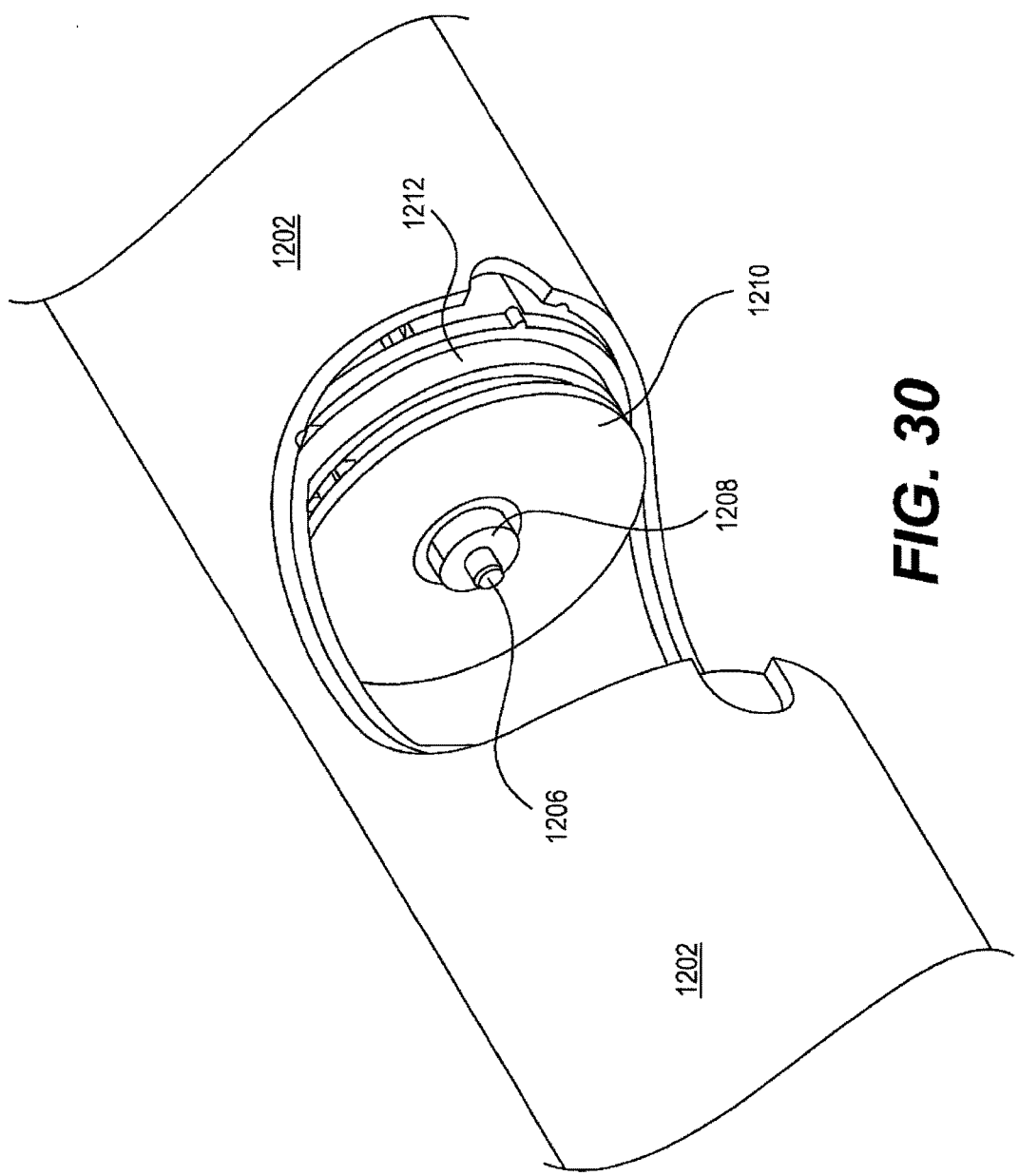

HIGH EFFICIENCY ROLLER SHADE AND METHOD FOR SETTING ARTIFICIAL STOPS

ROSS REFERENCE TO A RELATED APPLICATION

This application is a continuation of U.S. Ser. No. 15/203,293 which was filed Jul. 6, 2016, which is a continuation of U.S. Ser. No. 14/562,946 filed Dec. 8, 2014, now U.S. Pat. No. 9,410,369 issued Aug. 9, 2016, which is a continuation of U.S. Ser. No. 14/018,823 filed Sep. 5, 2013, now U.S. Pat. No. 8,947,027 issued Feb. 3, 2015, which is a continuation of U.S. Ser. No. 13/653,451 filed Oct. 17, 2012, now U.S. Pat. No. 8,575,872 issued Nov. 5, 2013, which is a continuation-in-part of U.S. Ser. No. 12/711,193 filed Feb. 23, 2010, now U.S. Pat. No. 8,368,328 issued Feb. 5, 2013.

FIELD OF THE INVENTION

The present invention relates to a motorized shade. Specifically, the present invention relates to a high-efficiency roller shade having operational limits without employing hard stops or limit switches.

BACKGROUND OF THE INVENTION

One ubiquitous form of window treatment is the roller shade. A common window covering during the 19th century, a roller shade is simply a rectangular panel of fabric, or other material, that is attached to a cylindrical, rotating tube. The shade tube is mounted near the header of the window such that the shade rolls up upon itself as the shade tube rotates in one direction, and rolls down to cover the a desired portion of the window when the shade tube is rotated in the opposite direction.

A control system, mounted at one end of the shade tube, can secure the shade at one or more positions along the extent of its travel, regardless of the direction of rotation of the shade tube. Simple mechanical control systems include ratchet-and-pawl mechanisms, friction brakes, clutches, etc. To roll the shade up and down, and to position the shade at intermediate locations along its extend of travel, ratchet-and-pawl and friction brake mechanisms require the lower edge of the shade to be manipulated by the user, while clutch mechanisms include a control chain that is manipulated by the user.

Not surprisingly, motorization of the roller shade was accomplished, quite simply, by replacing the simple, mechanical control system with an electric motor that is directly coupled to the shade tube. The motor may be located inside or outside the shade tube, is fixed to the roller shade support and is connected to a simple switch, or, in more sophisticated applications, to a radio frequency (RF) or infrared (IR) transceiver, that controls the activation of the motor and the rotation of the shade tube.

Many known motorized roller shades provide power, such as 120 VAC, 220/230 VAC 50/60 Hz, etc., to the motor and control electronics from the facility in which the motorized roller shade is installed. Recently-developed battery-powered roller shades provide installation flexibility by removing the requirement to connect the motor and control electronics to facility power. The batteries for these roller shades are typically mounted within, above, or adjacent to the shade mounting bracket, headrail or fascia. Unfortunately, these battery-powered systems suffer from many drawbacks, including, for example, high levels of self-generated noise, inadequate battery life, inadequate or nonexistent counterbalancing capability, inadequate or nonexistent manual operation capability, inconvenient installation requirements, and the like.

Moreover, setting the operational range of a motorized shade or blind is necessary to assure control of solar gain and privacy. Therefore many known motorized roller shade designs have taken several approaches, for example, external limit switches, internal limit switches, and hard stops which stall the motor at the limits. Limit switches have inherent drawbacks as they can be expensive and can fail over time. External limit switches are typically installed during the installation which can be time consuming whereas internal limit switches are installed into the control system of the shade or blind and can be operated by lead screws and nuts or cams also adding cost. Hard stops require the installer to run a set up routine after the shade or blind is installed and provide a satisfactory way to set the upper and lower travel limits which define the operational range of the shade or blind. Typical drawbacks to hard stops include the noise, the wear and tear on the components and in the case of battery power supplies and the use of additional current to stall the motor which shorten the battery life.

SUMMARY OF THE INVENTION

Embodiments of the present invention advantageously provide a motorized roller shade that includes a shade tube, a motor/controller unit and a power supply unit. The motor/controller unit is disposed within the shade tube, and includes a bearing, rotatably coupled to a support shaft, and a DC gear motor. The output shaft of the DC gear motor is coupled to the support shaft such that the output shaft and the support shaft do not rotate when the support shaft is attached to the mounting bracket.

Other embodiments of the present invention provide an internal motor/controller unit for a motorized roller shade that includes a bearing rotatably coupled to a support shaft, a DC gear motor and a DC gear motor mount that is attachable to the inner surface of the shade tube. The output shaft of the DC gear motor is coupled to the support shaft such that the output shaft and the support shaft do not rotate when the support shaft is attached to the mounting bracket.

Further embodiments of the present invention provide an internal power supply unit for a motorized roller shade that includes a battery tube, an outer end cap and an inner end cap. The outer end cap includes a bearing that is rotatably coupled to a support shaft that is attachable to a mounting bracket. The outer and inner end caps are attachable to the inner surface of the shade tube.

In yet another embodiment of the present invention, a method of setting the operational limits of a motorized shade or blind having a travel path is provided, comprising the steps of: translating or moving the motorized shade or blind to a first position within the travel path to create a first artificial stop; translating or moving the motorized shade or blind to a second position within the travel path to create a second artificial stop; and translating or moving the motorized shade or blind to a third position within the travel path to create a third artificial stop, wherein the motorized roller shade comprises: a counter; and a microprocessor, wherein the counter and the microprocessor are each configured to count a number of revolutions of the shade or blind to each of the first artificial stop, the second artificial stop and the third artificial stop.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 3 depicts an exploded, isometric view of the motorized roller shade assembly depicted in FIG. 2B.

FIGS. 7C, 7D and 7E depict isometric views of a motor/controller unit according to another alternative embodiment of the present invention.

FIGS. 9A and 9B depict exploded, isometric views of a power supply unit according to an alternative embodiment of the present invention.

DETAILED DESCRIPTION

Figure 1A:
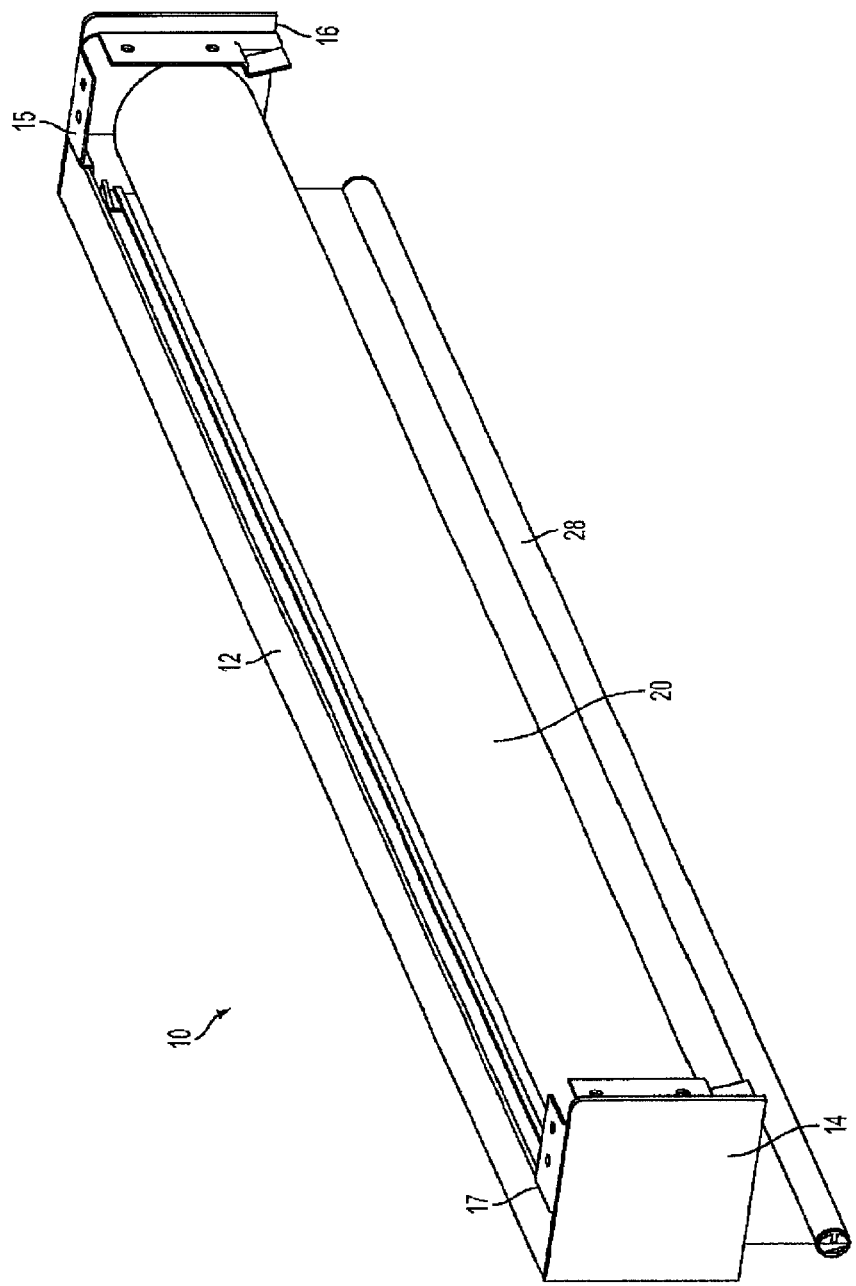
FIGS. 1A and 1B depict complementary isometric views of a motorized roller shade assembly, in accordance with embodiments of the present invention.

The invention will now be described with reference to the drawing figures, in which like reference numerals refer to like parts throughout. The term "shade" as used herein describes any flexible material, such as a shade, a curtain, a screen, etc., that can be deployed from, and retrieved onto, a storage tube.

Embodiments of the present invention provide a remote controlled motorized roller shade in which the batteries, DC gear motor, control circuitry are entirely contained within a shade tube that is supported by bearings. Two support shafts are attached to respective mounting brackets, and the bearings rotatably couple the shade tube to each support shaft. The output shaft of the DC gear motor is fixed to one of the support shafts, while the DC gear motor housing is mechanically coupled to the shade tube. Accordingly, operation of the DC gear motor causes the motor housing to rotate about the fixed DC gear motor output shaft, which causes the shade tube to rotate about the fixed DC gear motor output shaft as well. Because these embodiments do not require external wiring for power or control, great flexibility in mounting, and re-mounting, the motorized roller shade is provided.

Encapsulation of the motorization and control components within the shade tube, combined with the performance of the bearings and enhanced battery capacity of the DC gear motor configuration described above, greatly increases the number of duty cycles provided by a single set of batteries and provides a highly efficient roller shade. Additionally, encapsulation advantageously prevents dust and other contaminants from entering the electronics and the drive components.

In an alternative embodiment, the batteries may be mounted outside of the shade tube, and power may be provided to the components located within the shade tube using commutator or slip rings, induction techniques, and the like. Additionally, the external batteries may be replaced by any external source of DC power, such as, for example, an AC/DC power converter, a solar cell, etc.

Figure 1B:
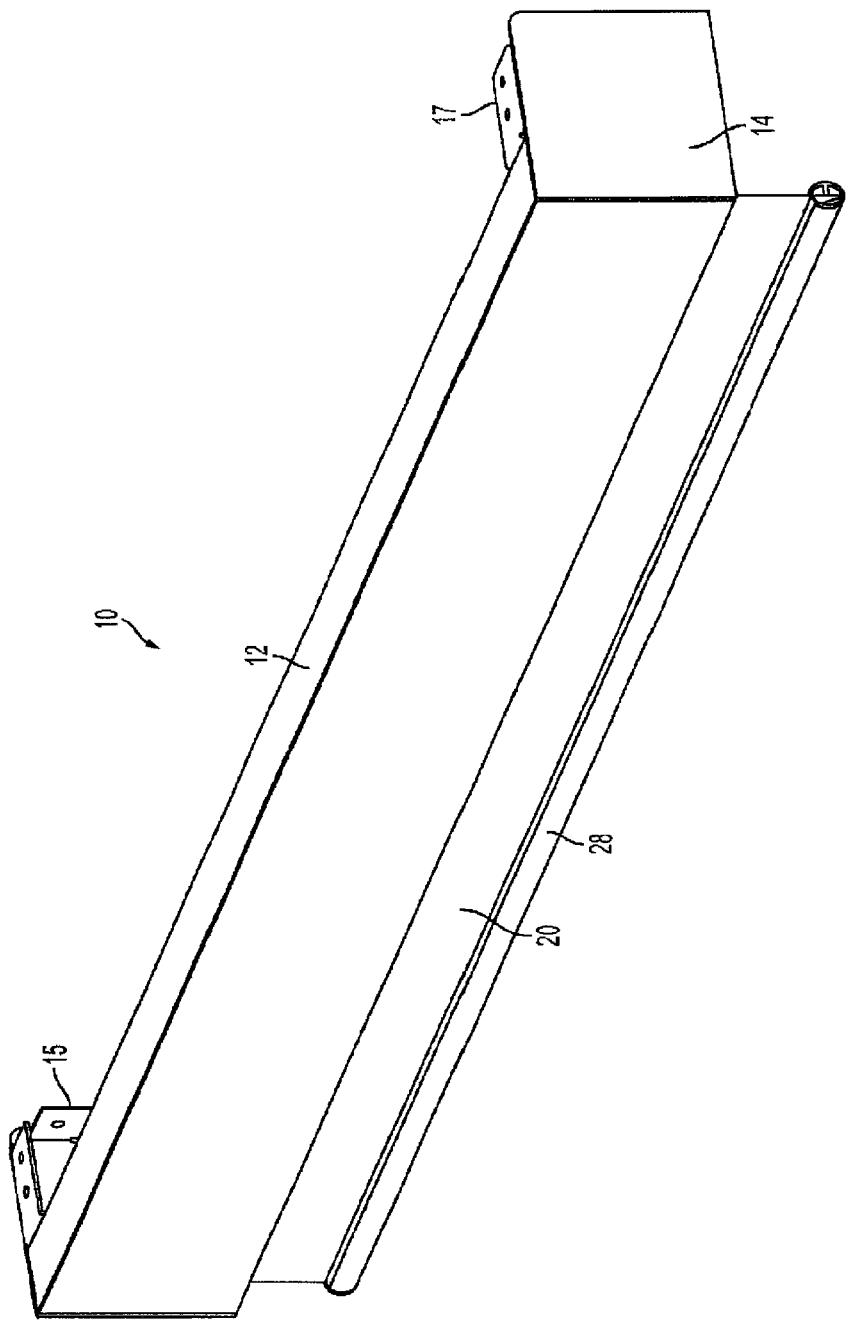
Figure 2A:
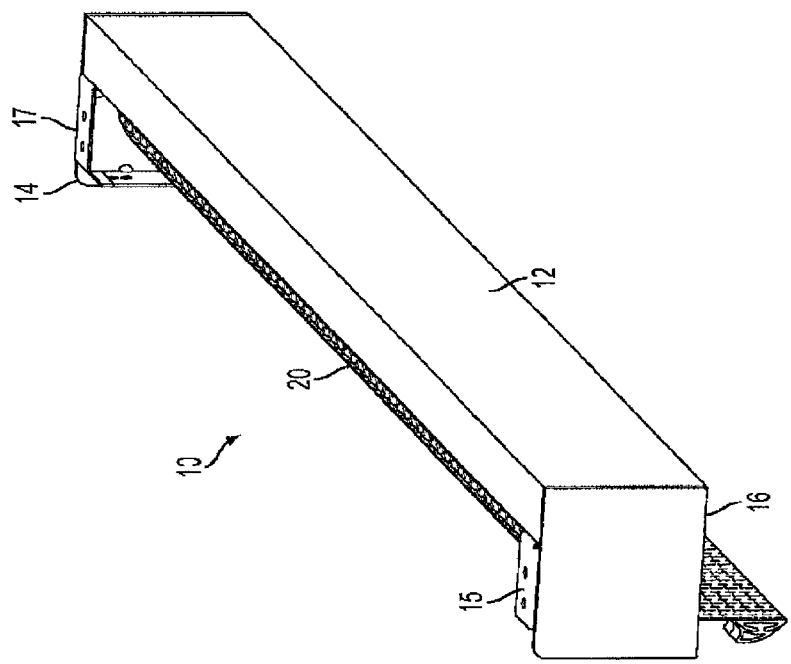
FIGS. 2A and 2B depict complementary isometric views of a motorized roller shade assembly, in accordance with embodiments of the present invention.
Figure 2B:
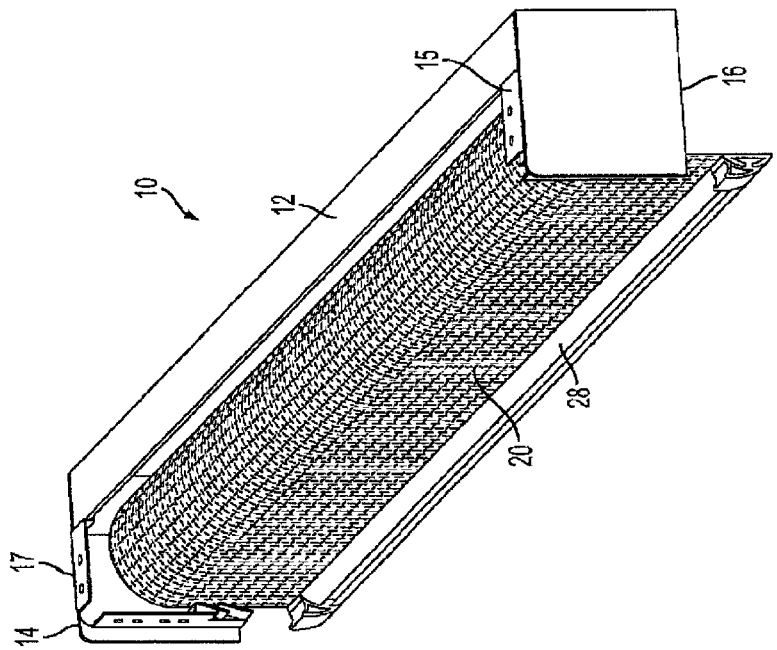

FIGS. 1A and 1B depict complementary isometric views of a motorized roller shade assembly 10 having a reverse payout, in accordance with embodiments of the present invention. FIGS. 2A and 2B depict complementary isometric views of a motorized roller shade assembly 10 having a standard payout, in accordance with embodiments of the present invention, while FIG. 3 depicts an exploded, isometric view of the motorized roller shade assembly 10 depicted in FIG. 2B. In one embodiment, motorized roller shade 20 is mounted near the top portion of a window, door, etc., using mounting brackets 5 and 7. In another embodiment, motorized roller shade 20 is mounted near the top portion of the window using mounting brackets 15 and 17, which also support fascia 12. In the latter embodiment, fascia end caps 14 and 16 attach to fascia 12 to conceal motorized roller shade 20, as well as mounting brackets 15 and 17.

Generally, motorized roller shade 20 includes a shade 22 and a motorized tube assembly 30. In a preferred embodiment, motorized roller shade 20 also includes a bottom bar 28 attached to the bottom of shade 22. In one embodiment, bottom bar 28 provides an end-of-travel stop, while in an alternative embodiment, end-of-travel stops 24 and 26 may be provided. As discussed in more detail below, in preferred embodiments, all of the components necessary to power and control the operation of the motorized roller shade 20 are advantageously located within motorized tube assembly 30.

Figure 4:
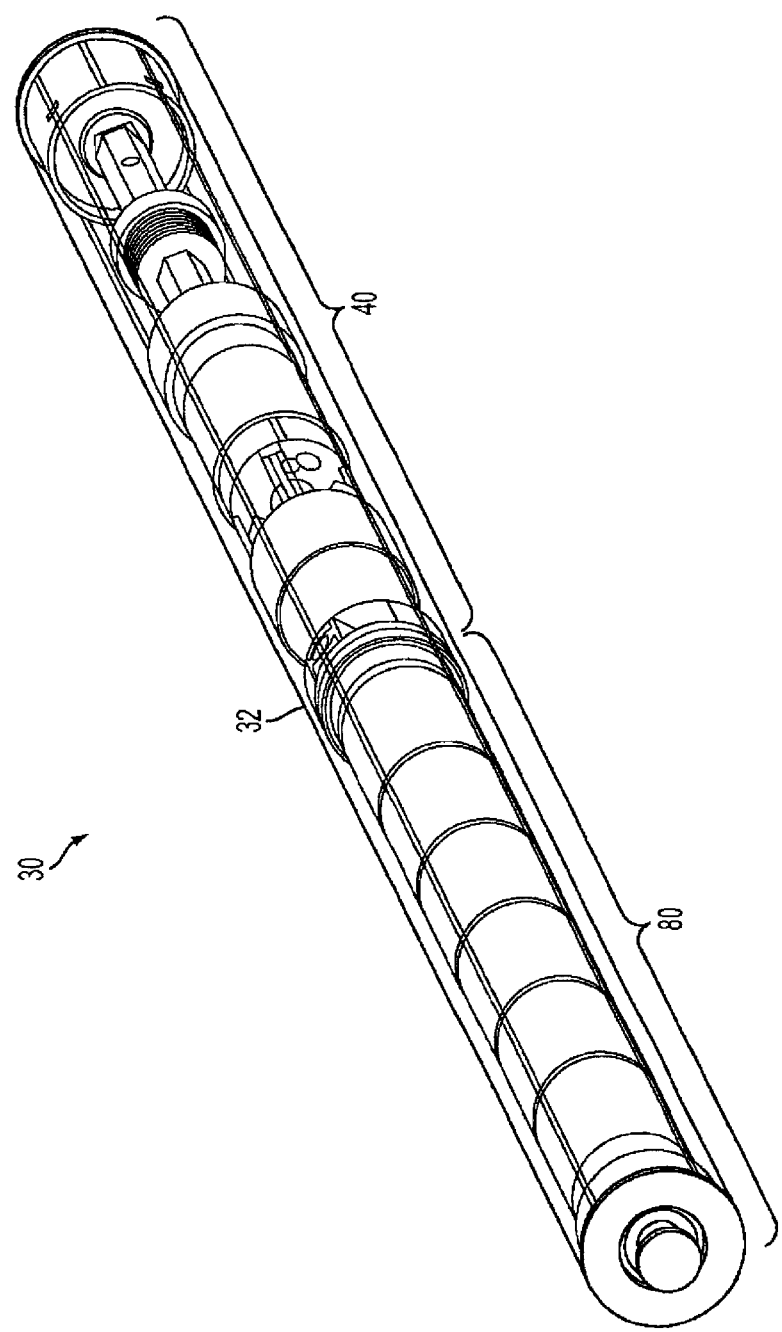
FIG. 4 depicts an isometric view of a motorized tube assembly, according to one embodiment of the present invention.
Figure 5:
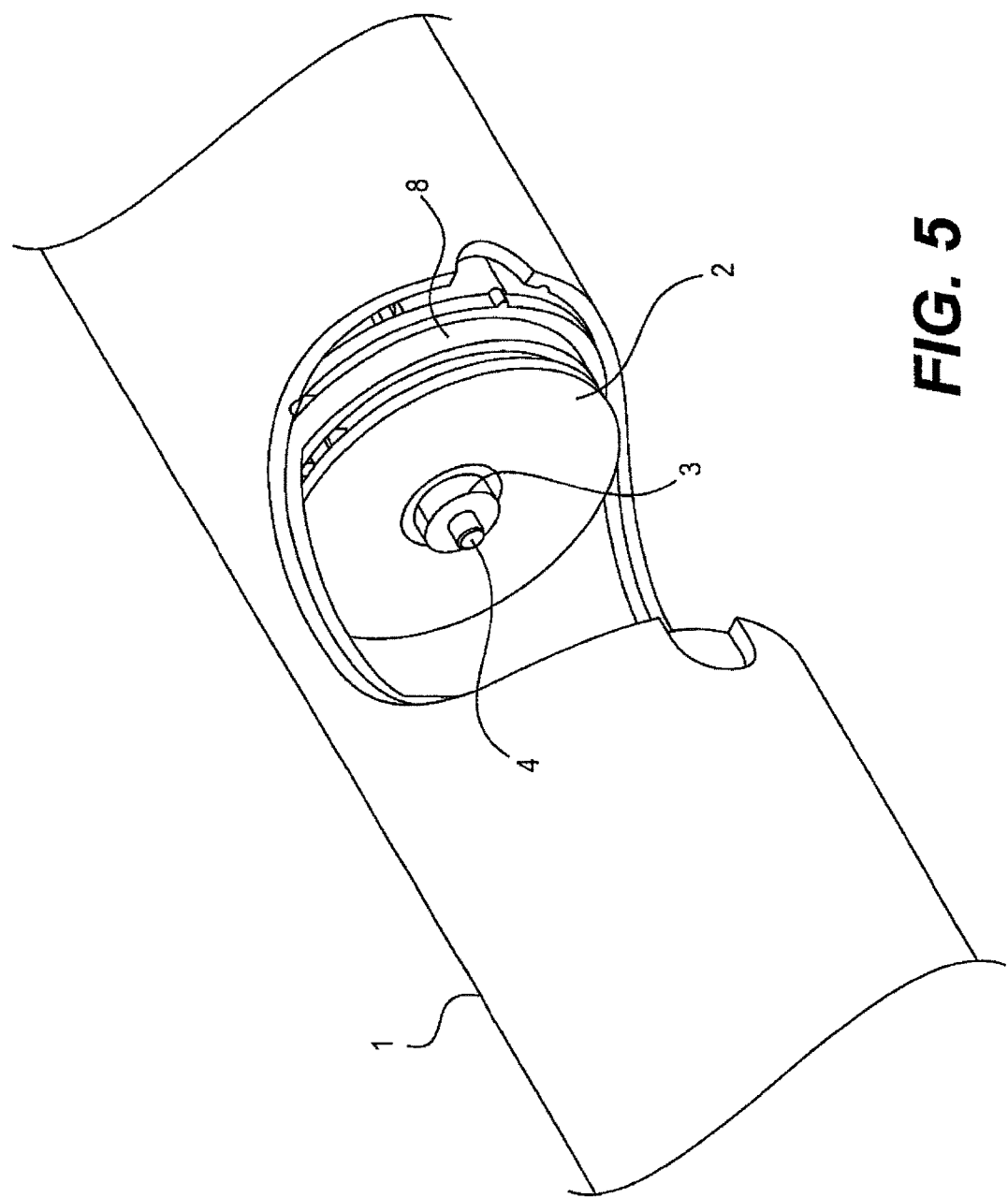
FIG. 5 depicts a partially-exploded, isometric view of the motorized tube assembly depicted in FIG. 4.

FIGS. 4 and 5 depict isometric views of motorized tube assembly 30, according to one embodiment of the present invention. Motorized tube assembly 30 includes a shade tube 32, motor/controller unit 40 and battery tube unit 80. The top of shade 22 is attached to the outer surface of shade tube 32, while motor/controller unit 40 and battery tube unit 80 are located within an inner cavity defined by the inner surface of shade tube 32.

Figure 6:
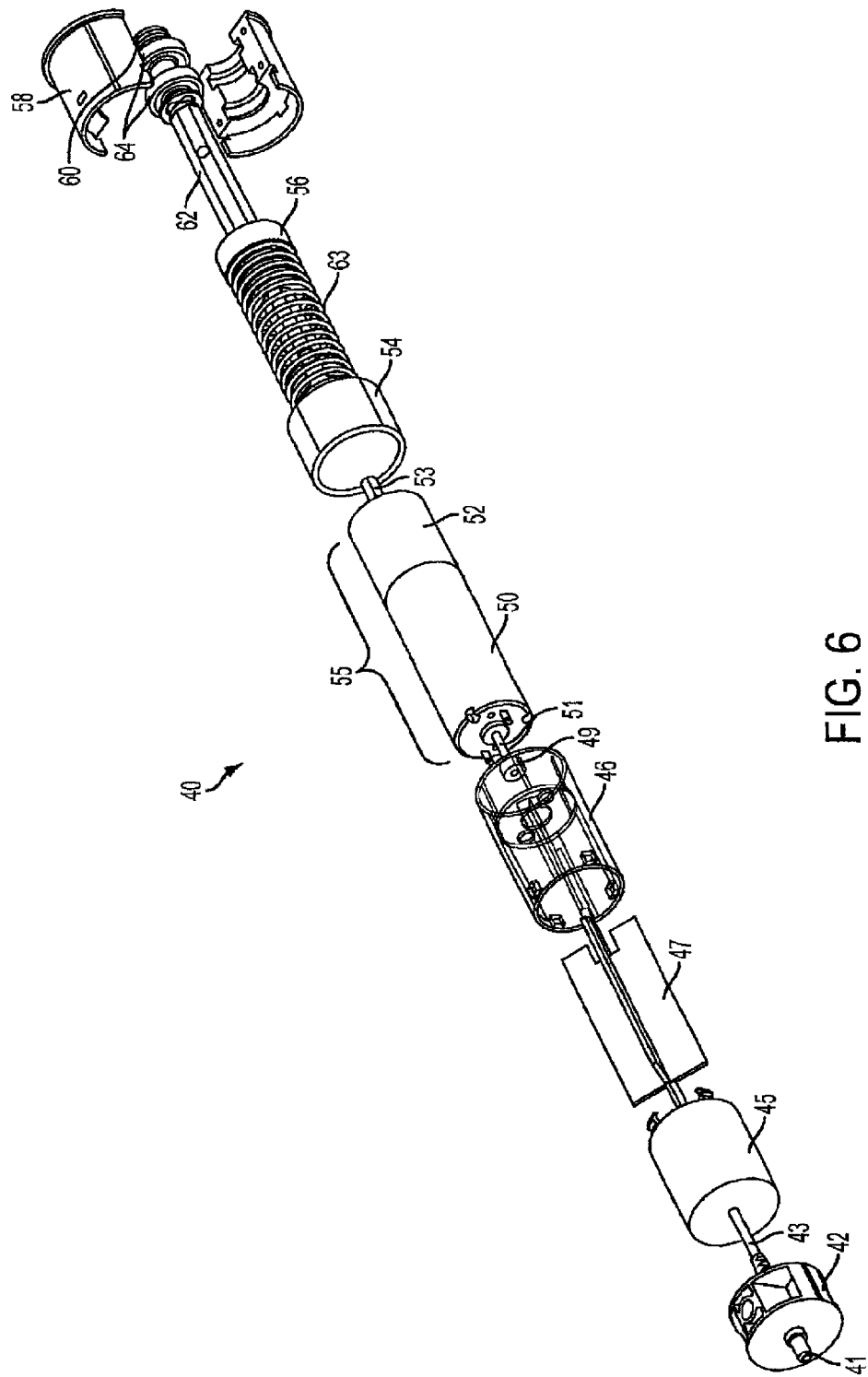
FIG. 6 depicts an exploded, isometric view of the motor/controller unit depicted in FIG. 5.

FIG. 6 depicts an exploded, isometric view of the motor/controller unit 40 depicted in FIG. 5. Generally, the motor/controller unit 40 includes an electrical power connector 42, a circuit board housing 44, a DC gear motor 55 that includes a DC motor 50 and an integral motor gear reducing assembly 52, a mount 54 for the DC gear motor 55, and a bearing housing 58.

The electrical power connector 42 includes a terminal 41 that couples to the power supply unit 80, and power cables 43 that connect to the circuit board(s) located within the circuit board housing 44. Terminal 41 includes positive and negative connectors that mate with cooperating positive and negative connectors of power supply unit 80, such as, for example, plug connectors, blade connectors, a coaxial connector, etc. In a preferred embodiment, the positive and negative connectors do not have a preferred orientation. The electrical power connector 42 is mechanically coupled to the inner surface of the shade tube 32 using a press fit, an interference fit, a friction fit, a key, adhesive, etc.

The circuit board housing 44 includes an end cap 45 and a housing body 46 within which at least one circuit board 47 is mounted. In the depicted embodiment, two circuit boards 47 are mounted within the circuit board housing 44 in an orthogonal relationship. Circuit boards 47 generally include all of the supporting circuitry and electronic components necessary to sense and control the operation of the motor 50, manage and/or condition the power provided by the power supply unit 80, etc., including, for example, a controller or microcontroller, memory, a wireless receiver, etc. In one embodiment, the microcontroller is an Microchip 8-bit microcontroller, such as the PIC18F25K20, while the wireless receiver is a Micrel QwikRadio® receiver, such as the MICRF219. The microcontroller may be coupled to the wireless receiver using a local processor bus, a serial bus, a serial peripheral interface, etc. In another embodiment, the wireless receiver and microcontroller may be integrated into a single chip, such as, for example, the Zensys ZW0201 Z-Wave Single Chip, etc.

The antenna for the wireless receiver may mounted to the circuit board or located, generally, inside the circuit board housing 44. Alternatively, the antenna may be located outside the circuit board housing 44, including, for example, the outer surface of the circuit board housing 44, the inner surface of the shade tube 32, the outer surface of the shade tube 32, the bearing housing 58, etc. The circuit board housing 44 may be mechanically coupled to the inner surface of the shade tube 32 using, for example, a press fit, an interference fit, a friction fit, a key, adhesive, etc.

In another embodiment, a wireless transmitter is also provided, and information relating to the status, performance, etc., of the motorized roller shade 20 may be transmitted periodically to a wireless diagnostic device, or, preferably, in response to a specific query from the wireless diagnostic device. In one embodiment, the wireless transmitter is a Micrel QwikRadio® transmitter, such as the MICRF102. A wireless transceiver, in which the wireless transmitter and receiver are combined into a single component, may also be included, and in one embodiment, the wireless transceiver is a Micrel RadioWire® transceiver, such as the MICRF506. In another embodiment, the wireless transceiver and microcontroller may be integrated into a single module, such as, for example, the Zensys ZM3102 Z-Wave Module, etc. The functionality of the microcontroller, as it relates to the operation of the motorized roller shade 20, is discussed in more detail below.

In an alternative embodiment, the shade tube 32 includes one or more slots to facilitate the transmission of wireless signal energy to the wireless receiver, and from the wireless transmitter, if so equipped. For example, if the wireless signal is within the radio frequency (RF) band, the slot may be advantageously matched to the wavelength of the signal. For one RF embodiment, the slot is ⅛" wide and 2½" long; other dimensions are also contemplated.

The DC motor 50 is electrically connected to the circuit board 47, and has an output shaft that is connected to the input shaft of the motor gear reducing assembly 52. The DC motor 50 may also be mechanically coupled to the circuit board housing body 46 using, for example, a press fit, an interference fit, a friction fit, a key, adhesive, mechanical fasteners, etc. In various embodiments of the present invention, DC motor 50 and motor gear reducing assembly 52 are provided as a single mechanical package, such as the DC gear motors manufactured by Buhler Motor Inc.

In one preferred embodiment, DC gear motor 55 includes a 24V DC motor and a two-stage planetary gear system with a 40:1 ratio, such as, for example, Buhler DC Gear Motor 1.61.077.423, and is supplied with an average battery voltage of $9.6V_{avg}$ provided by an eight D-cell battery stack. Other alternative embodiments are also contemplated by the present invention. However, this preferred embodiment offers particular advantages over many alternatives, including, for example, embodiments that include smaller average battery voltages, smaller battery sizes, 12V DC motors, three-stage planetary gear systems, etc.

For example, in this preferred embodiment, the 24V DC gear motor 55 draws a current of about 0.1 A when supplied with a battery voltage of $9.6V_{avg}$. However, under the same torsional loading and output speed (e.g., 30 rpm), a 12V DC gear motor with a similar gear system, such as, e.g., Baler DC Gear Motor 1.61.077.413, will draw a current of about 0.2 A when supplied with a battery voltage of 4.8V.sub.avg. Assuming similar motor efficiencies, the 24V DC gear motor supplied with 9.6V.sub.avg advantageously draws about 50% less current than the 12V DC gear motor supplied with 4.8V.sub.avg while producing the same power output.

In preferred embodiments of the present invention, the rated voltage of the DC gear motor is much greater than the voltage produced by the batteries, by a factor of two or more, for example, causing the DC motor to operate at a reduced speed and torque rating, which advantageously eliminates undesirable higher frequency noise and draws lower current from the batteries, thereby improving battery life. In other words, applying a lower-than-rated voltage to the DC gear motor causes the motor to run at a lower-than-rated speed to produce quieter operation and longer battery life as compared to a DC gear motor running at its rated voltage, which draws similar amperage while producing lower run cycle times to produce equivalent mechanical power. In the embodiment described above, the 24V DC gear motor, running at lower voltages, enhances the cycle life of the battery operated roller shade by about 20% when compared to a 12V DC gear motor using the same battery capacity. Alkaline, zinc and lead acid batteries may provide better performance than lithium or nickel batteries, for example.

In another example, four D-cell batteries produce an average battery voltage of about 4.8V.sub.avg, while eight D-cell batteries produce an average battery voltage of about 9.6V.sub.avg. Clearly, embodiments that include an eight D-cell battery stack advantageously provide twice as much battery capacity than those embodiments that include a four D-cell battery stack. Of course, smaller battery sizes, such as, e.g., C-cell, AA-cell, etc., offer less capacity than D-cells.

In a further example, supplying a 12V DC gear motor with 9.6V.sub.avg increases the motor operating speed, which requires a higher gear ratio in order to provide the same output speed as the 24V DC gear motor discussed above. In other words, assuming the same torsional loading, output speed (e.g., 30 rpm) and average battery voltage (9.6V.sub.avg), the motor operating speed of the 24V DC gear motor will be about 50% of the motor operating speed of the 12V DC gear motor. The higher gear ratio typically requires an additional planetary gear stage, which reduces motor efficiency, increases generated noise, reduces backdrive performance and may require a more complex motor controller. Consequently, those embodiments that include a 24V DC gear motor supplied with 9.6V.sub.avg offer higher efficiencies and less generated noise.

In one embodiment, the shaft 51 of DC motor 50 protrudes into the circuit board housing 44, and a multi-pole magnet 49 is attached to the end of the motor shaft 51. A magnetic encoder (not shown for clarity) is mounted on the circuit board 47 to sense the rotation of the multi-pole magnet 49, and outputs a pulse for each pole of the multi-pole magnet 49 that moves past the encoder. In a preferred embodiment, the multi-pole magnet 49 has eight poles and the gear reducing assembly 52 has a gear ratio of 30:1, so that the magnetic encoder outputs 240 pulses for each revolution of the shade tube 32. The controller advantageously counts these pulses to determine the operational and positional characteristics of the shade, curtain, etc. Other types of encoders may also be used, such as optical encoders, mechanical encoders, etc.

The number of pulses output by the encoder may be associated with a linear displacement of the shade 22 by a distance/pulse conversion factor or a pulse/distance conversion factor. In one embodiment, this conversion factor is constant regardless of the position of shade 22. For example, using the outer diameter d of the shade tube 32, e.g., 1⅝ inches (1.625 inches), each rotation of the shade tube 32 moves the shade 22 a linear distance of .pi.*d, or about 5 inches. For the eight-pole magnet 49 and 30:1 gear reducing assembly 52 embodiment discussed above, the distance/pulse conversion factor is about 0.02 inches/pulse, while the pulse/distance conversion factor is about 48 pulses/inch. In another example, the outer diameter of the fully-wrapped shade 22 may be used in the calculation. When a length of shade 22 is wrapped on shade tube 32, such as 8 feet, the outer diameter of the wrapped shade 22 depends upon the thickness of the shade material. In certain embodiments, the outer diameter of the wrapped shade 22 may be as small as 1.8 inches or as large as 2.5 inches.

For the latter case, the distance/pulse conversion factor is about 0.03 inches/pulse, while the pulse/distance conversion factor is about 30 pulses/inch. Of course, any diameter between these two extremes, i.e., the outer diameter of the shade tube 32 and the outer diameter of the wrapped shade 22, may be used. These approximations generate an error between the calculated linear displacement of the shade and the true linear displacement of the shade, so an average or intermediate diameter may preferably reduce the error. In another embodiment, the conversion factor may be a function of the position of the shade 22, so that the conversion factor depends upon the calculated linear displacement of the shade 22.

In various preferred embodiments discussed below, the position of the shade 22 is determined and controlled based on the number of pulses that have been detected from a known position of shade 22. While the open position is preferred, the closed position may also be used as the known position. In order to determine the full range of motion of shade 22, for example, the shade may be electrically moved to the open position, an accumulated pulse counter may be reset and the shade 22 may then be moved to the closed position, manually and/or electrically. The total number of accumulated pulses represents the limit of travel for the shade, and any desirable intermediate positions may be calculated based on this number.

For example, an 8 foot shade that moves from the open position to the closed position may generate 3840 pulses, and various intermediate positions of the shade 22 can be advantageously determined, such as, 25% open, 50% open, 75% open, etc. Quite simply, the number of pulses between the open position and the 75% open position would be 960, the number of pulses between the open position and the 50% open position would be 1920, and so on. Controlled movement between these predetermined positions is based on the accumulated pulse count. For example, at the 50% open position, this 8 foot shade would have an accumulated pulse count of 1920, and controlled movement to the 75% open position would require an increase in the accumulated pulse count to 2880. Accordingly, movement of the shade 22 is determined and controlled based on accumulating the number of pulses detected since the shade 22 was deployed in the known position. An average number of pulses/inch may be calculated based on the total number of pulses and the length of shade 22, and an approximate linear displacement of the shade 22 can be calculated based on the number of pulses accumulated over a given time period. In this example, the average number of pulses/inch is 40, so movement of the shade 22 about 2 inches would generate about 80 pulses. Positional errors are advantageously eliminated by resetting the accumulated pulse counter to zero whenever the shade 22 is moved to the known position.

A mount 54 supports the DC gear motor 55, and may be mechanically coupled to the inner surface of the shade tube 32. In one embodiment, the outer surface of the mount 54 and the inner surface of the shade tube 32 are smooth, and the mechanical coupling is a press fit, an interference fit, a friction fit, etc. In another embodiment, the outer surface of the mount 54 includes several raised longitudinal protrusions that mate with cooperating longitudinal recesses in the inner surface of the shade tube 32. In this embodiment, the mechanical coupling is keyed; a combination of these methods is also contemplated. If the frictional resistance is small enough, the motor/controller unit 40 may be removed from the shade tube 32 for inspection or repair; in other embodiments, the motor/controller unit 40 may be permanently secured within the shade tube 32 using adhesives, etc.

As described above, the circuit board housing 44 and the mount 54 may be mechanically coupled to the inner surface of the shade tube 32. Accordingly, at least three different embodiments are contemplated by the present invention. In one embodiment, the circuit board housing 44 and the mount 54 are both mechanically coupled to the inner surface of the shade tube 32. In another embodiment, only the circuit board housing 44 is mechanically coupled to the inner surface of the shade tube 32. In a further embodiment, only the mount 54 is mechanically coupled to the inner surface of the shade tube 32.

The output shaft of the DC gear motor 55 is fixed to the support shaft 60, either directly (not shown for clarity) or through an intermediate shaft 62. When the motorized roller shade 20 is installed, support shaft 60 is attached to a mounting bracket that prevents the support shaft 60 from rotating. Because (a) the output shaft of the DC gear motor 55 is coupled to the support shaft 60 which is fixed to the mounting bracket, and (b) the DC gear motor 55 is mechanically-coupled to the shade tube, operation of the DC gear motor 55 causes the DC gear motor 55 to rotate about the fixed output shaft, which causes the shade tube 32 to rotate about the fixed output shaft as well.

Bearing housing 58 includes one or more bearings 64 that are rotatably coupled to the support shaft 60. In a preferred embodiment, bearing housing 58 includes two rolling element bearings, such as, for example, spherical ball bearings; each outer race is attached to the bearing housing 58, while each inner race is attached to the support shaft 60. In a preferred embodiment, two ball bearings are spaced about ⅜" apart giving a total support land of about 0.8" or 20 mm; in an alternative embodiment, the intra-bearing spacing is about twice the diameter of support shaft 60. Other types of low-friction bearings are also contemplated by the present invention.

The motor/controller unit 40 may also include counterbalancing. In a preferred embodiment, motor/controller unit 40 includes a fixed perch 56 attached to intermediate shaft 62. In this embodiment, mount 54 functions as a rotating perch, and a counterbalance spring 63 (not shown in FIG. 5 for clarity; shown in FIG. 6) is attached to the rotating perch 54 and the fixed perch 56. The intermediate shaft 62 may be hexagonal in shape to facilitate mounting of the fixed perch 56. Preloading the counterbalance spring advantageously improves the performance of the motorized roller shade 20.

Figure 7A:
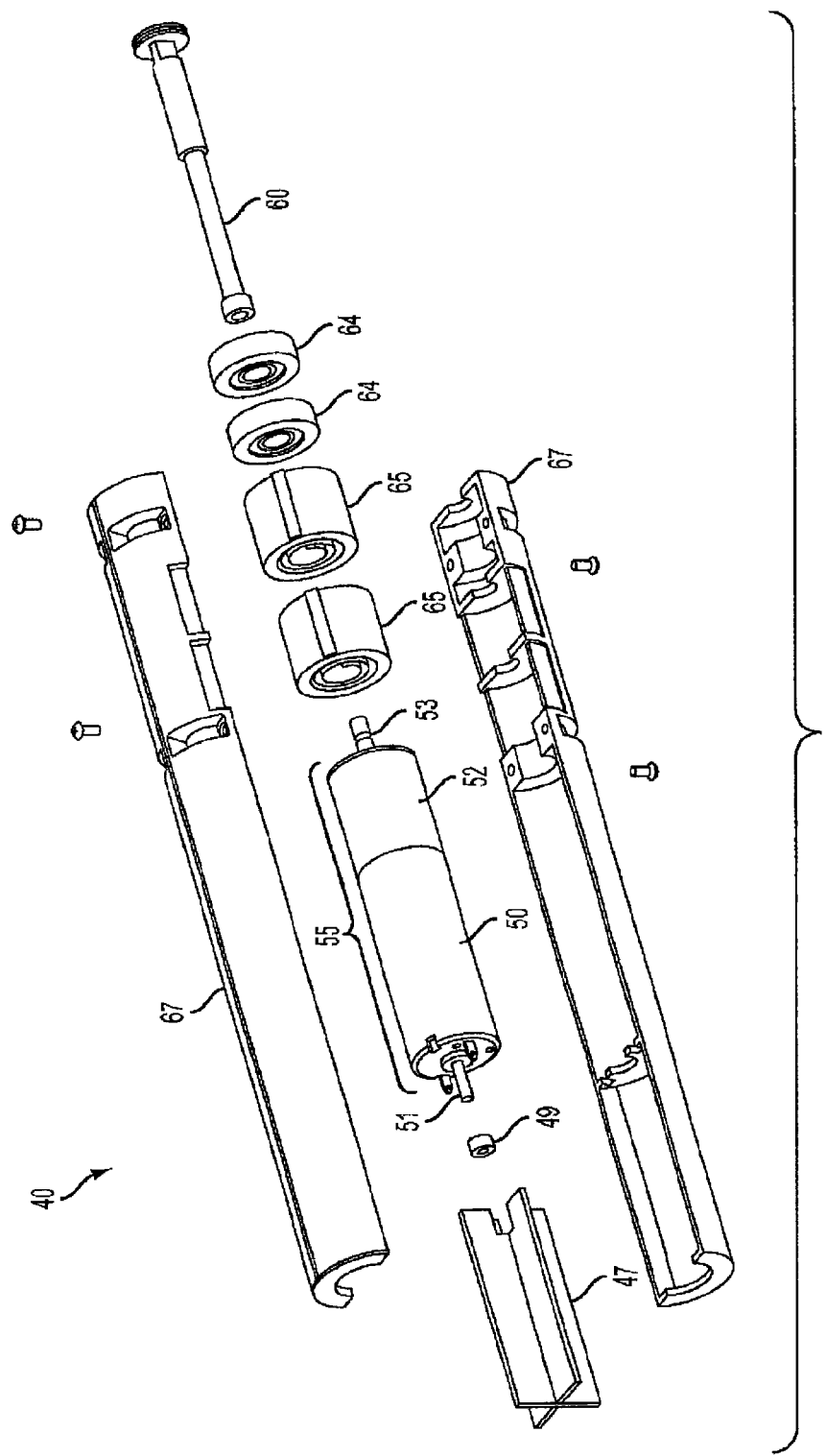
FIGS. 7A and 7B depict exploded, isometric views of a motor/controller unit according to an alternative embodiment of the present invention.
Figure 7B:
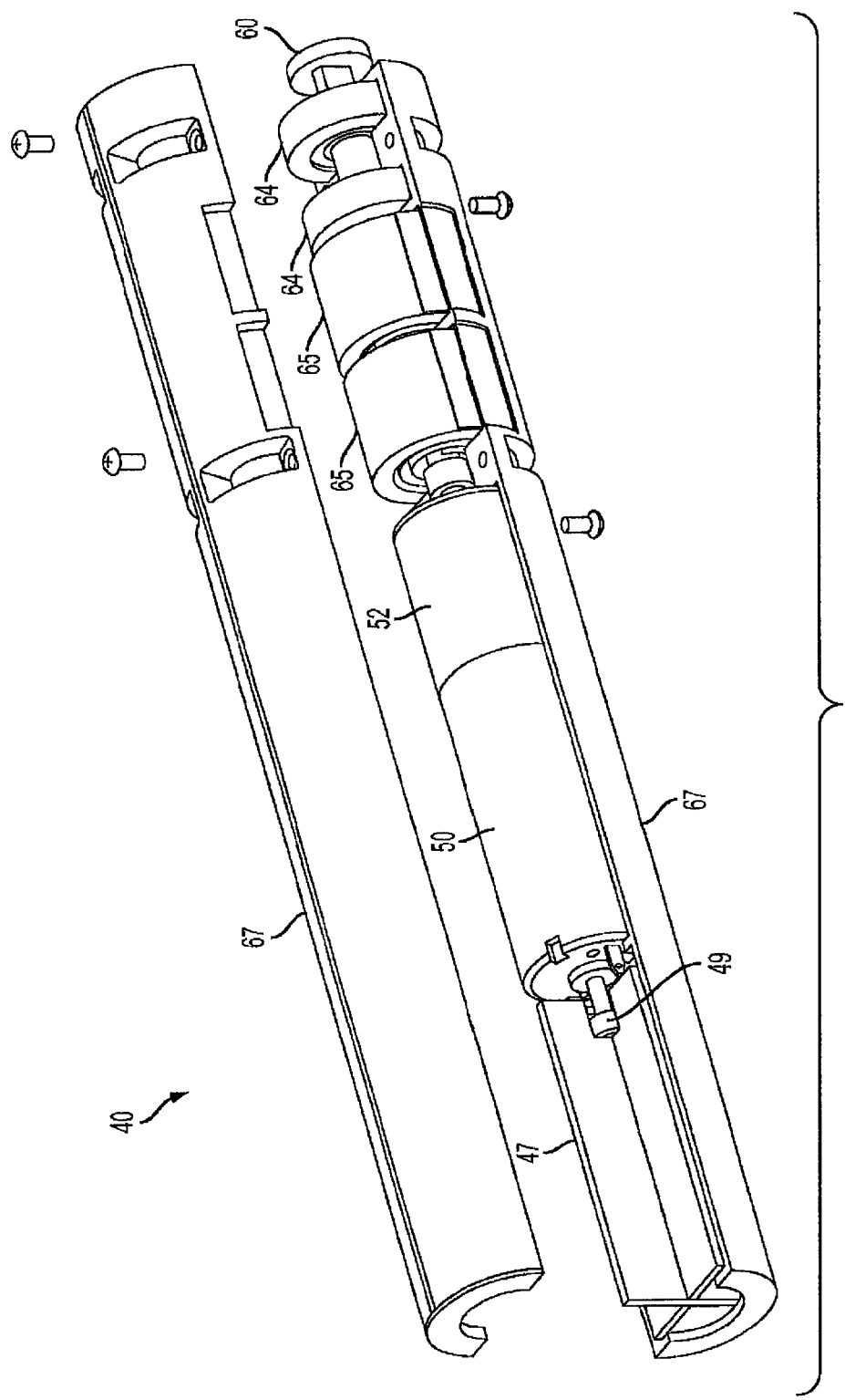

FIGS. 7A and 7B depict exploded, isometric views of a motor/controller unit 40 according to an alternative embodiment of the present invention. In this embodiment, housing 67 contains the major components of the motor/controller unit 40, including DC gear motor 55 (e.g., DC motor 50 and motor gear reducing assembly 52), one or more circuit boards 47 with the supporting circuitry and electronic components described above, and at least one bearing 64. The output shaft 53 of the DC gear motor 55 is fixedly-attached to the support shaft 60, while the inner race of bearing 64 is rotatably-attached support shaft 60. In one counterbalance embodiment, at least one power spring 65 is disposed within housing 67, and is rotatably-attached to support shaft 60. Housing 67 may be formed from two complementary sections, fixed or removably joined by one or more screws, rivets, etc.

Figure 7C:
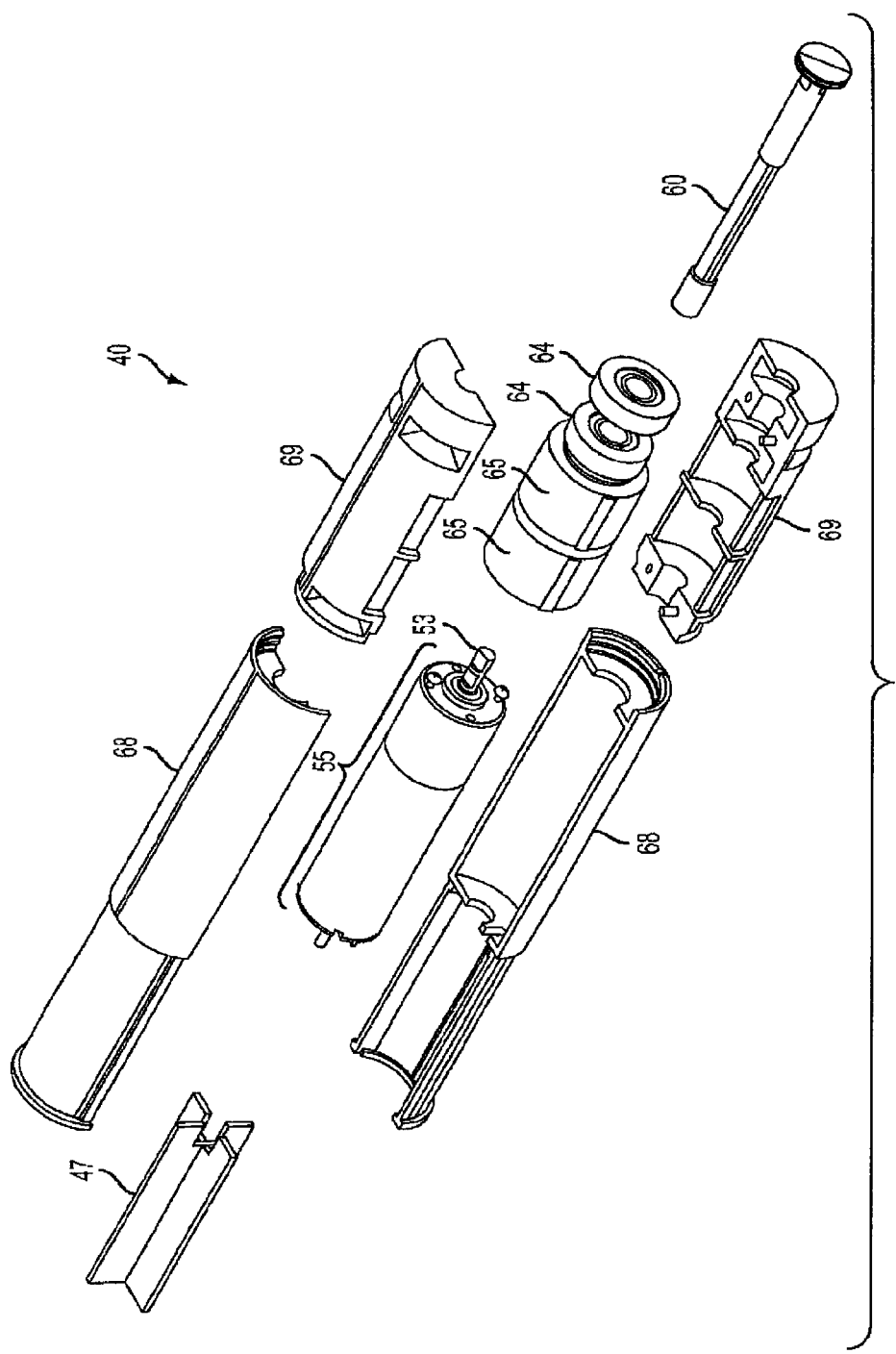

FIGS. 7C, 7D and 7E depict isometric views of a motor/controller unit 40 according to another alternative embodiment of the present invention. In this embodiment, housing 68 contains the DC gear motor 55 (e.g., DC motor 50 and motor gear reducing assembly 52), one or more circuit boards 47 with the supporting circuitry and electronic components described above, while housing 69 includes at least one bearing 64. Housings 68 and 69 may be attachable to one another, either removably or permanently. The output shaft 53 of the DC gear motor 55 is fixedly-attached to the support shaft 60, while the inner race of bearing 64 is rotatably-attached support shaft 60. In one counterbalance embodiment, at least one power spring 65 is disposed within housing 69, and is rotatably-attached to support shaft 60. While the depicted embodiment includes two power springs 65, three (or more) power springs 65 may be used, depending on the counterbalance force required, the available space within shade tube 32, etc. Housings 68 and 69 may be formed from two complementary sections, fixed or removably joined by one or more screws, rivets, etc.

Figure 8A:
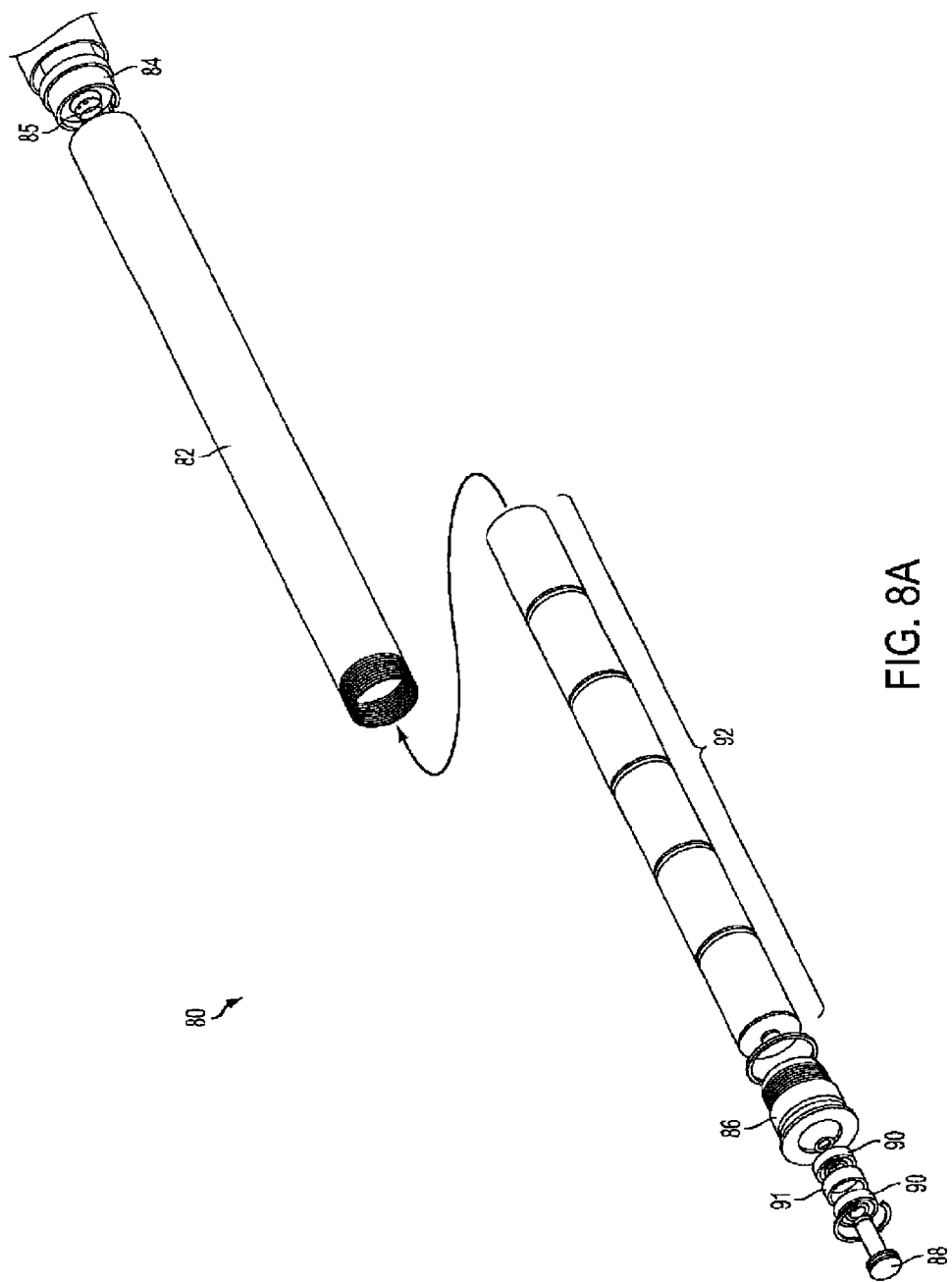
FIG. 8A depicts an exploded, isometric view of the power supply unit depicted in FIGS. 4 and 5.

FIG. 8A depicts an exploded, isometric view of the power supply unit 80 depicted in FIGS. 4 and 5. Generally, the power supply unit 80 includes a battery tube 82, an outer end cap 86, and a inner end cap 84. The outer end cap 86 includes one or more bearings 90 that are rotatably coupled to a support shaft 88. In a preferred embodiment, outer end cap 86 includes two low-friction rolling element bearings, such as, for example, spherical ball bearings, separated by a spacer 91; each outer race is attached to the outer end cap 86, while each inner race is attached to the support shaft 88. Other types of low-friction bearings are also contemplated by the present invention. In one alternative embodiment, bearings 86 are simply bearing surfaces, preferably low-friction bearing surfaces, while in another alternative embodiment, support shaft 88 is fixedly attached to the outer end cap 86, and the external shade support bracket provides the bearing surface for the support shaft 88.

In the depicted embodiment, the outer end cap 86 is removable and the inner cap 84 is fixed. In other embodiments, the inner end cap 84 may be removable and the outer end cap 86 may be fixed, both end caps may be removable, etc. The removable end cap(s) may be threaded, slotted, etc.

The outer end cap 86 also includes a positive terminal that is coupled to the battery tube 82. The inner end cap 84 includes a positive terminal coupled to the battery tube 82, and a negative terminal coupled to a conduction spring 85. When a battery stack 92, including at least one battery, is installed in the battery tube 82, the positive terminal of the outer end cap 86 is electrically coupled to the positive terminal of one of the batteries in the battery stack 92, and the negative terminal of the inner end cap 84 is electrically coupled to the negative terminal of another one of the batteries in the battery stack 92. Of course, the positive and negative terminals may be reversed, so that the conduction spring 85 contacts the positive terminal of one of the batteries in the battery stack 92, etc.

The outer end cap 86 and the inner end cap 84 are mechanically coupled to the inner surface of the shade tube 32. In one embodiment, the outer surface of the mount 84 and the inner surface of the shade tube 32 are smooth, and the mechanical coupling is a press fit, an interference fit, a friction fit, etc. In another embodiment, the outer surface of the mount 84 includes several raised longitudinal protrusions that mate with cooperating longitudinal recesses in the inner surface of the shade tube 32. In this embodiment, the mechanical coupling is keyed; a combination of these methods is also contemplated. Importantly, the frictional resistance should be small enough such that the power supply unit 80 can be removed from the shade tube 32 for inspection, repair and battery replacement.

In a preferred embodiment, the battery stack 92 includes eight D-cell batteries connected in series to produce an average battery stack voltage of 9.6V.sub.avg. Other battery sizes, as well as other DC power sources disposable within battery tube 82, are also contemplated by the present invention.

After the motor/controller unit 40 and power supply unit 80 are built up as subassemblies, final assembly of the motorized roller shade 20 is quite simple. The electrical connector 42 is fitted within the inner cavity of shade tube 32 to a predetermined location; power cables 43 has a length sufficient to permit the remaining sections of the motor/controller unit 40 to remain outside the shade tube 32 until the electrical connector 42 is properly seated. The remaining sections of the motor/controller unit 40 are then fitted within the inner cavity of shade tube 32, such that the bearing housing 58 is approximately flush with the end of the shade tube 32. The power supply unit 80 is then inserted into the opposite end until the positive and negative terminals of the inner end cap 84 engage the terminal 41 of the electrical connector 42. The outer end cap 86 should be approximately flush with end of the shade tube 32.

Figure 8B:
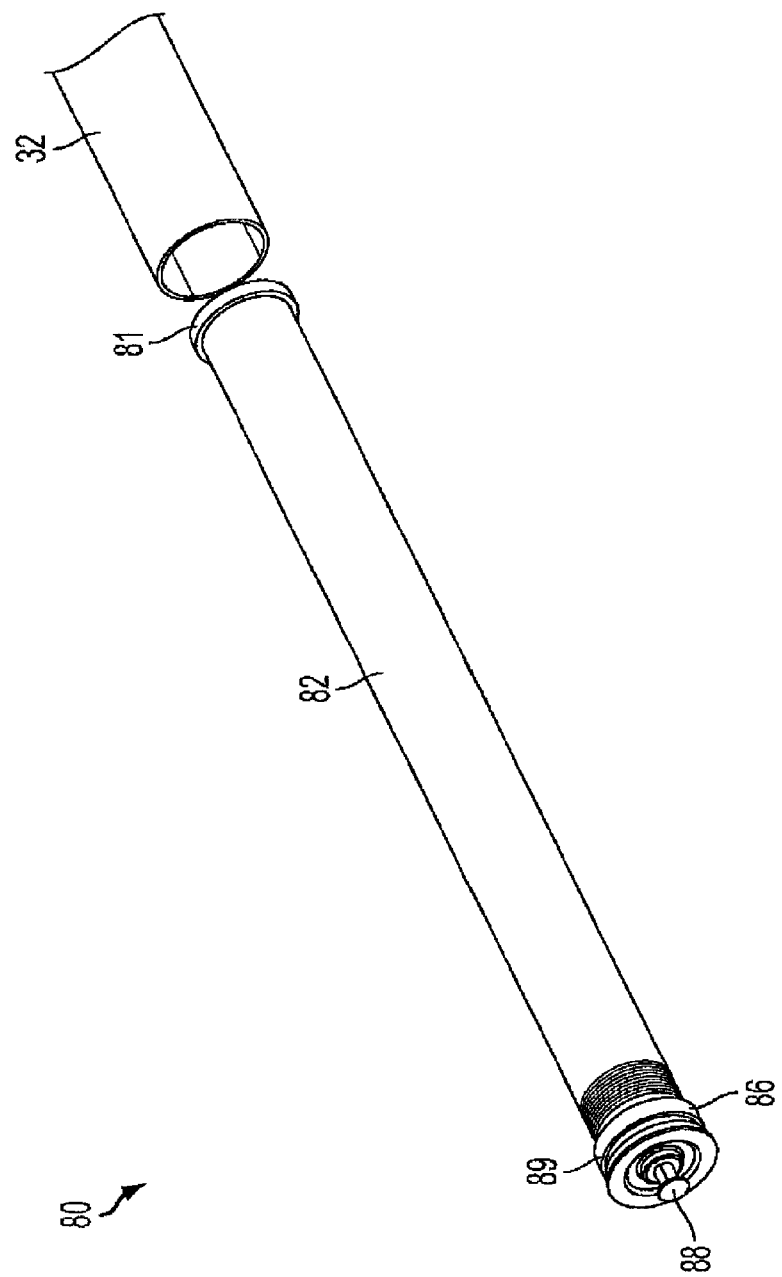
FIGS. 8B and 8C depict an exploded, isometric view of a power supply unit according to an alternative embodiment of the present invention.

In the alternative embodiment depicted in FIG. 8B, the outer end cap 86 is mechanically coupled to the inner surface of the shade tube 32 using a press fit, interference fit, an interference member, such as O-ring 89, etc., while the inner end cap 81 is not mechanically coupled to the inner surface of the shade tube 32.

Figure 8C:
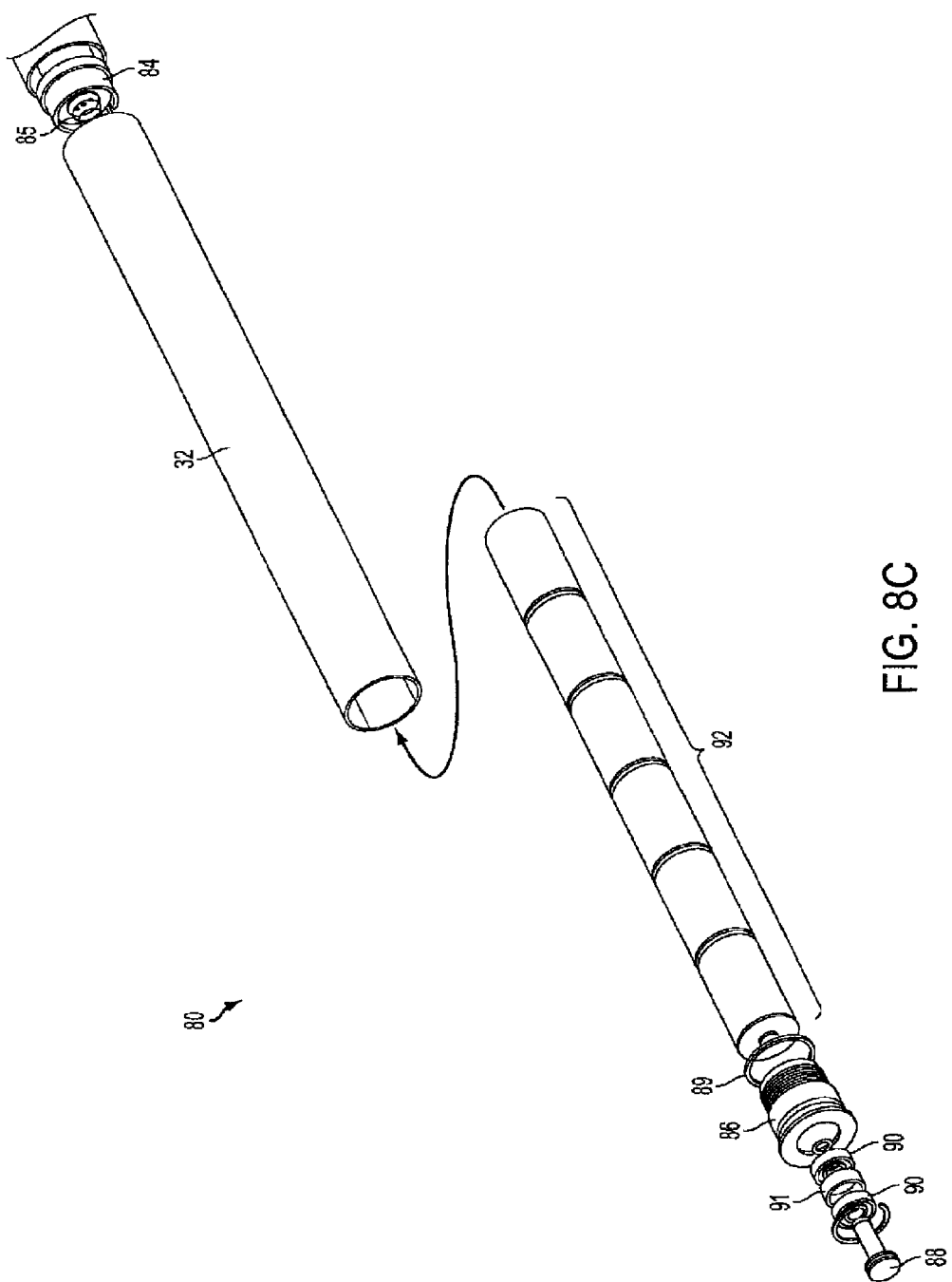

In the alternative embodiment depicted in FIG. 8C, the shade tube 32 functions as the battery tube 82, and the battery stack 92 is simply inserted directly into shade tube 32 until one end of the battery stack 92 abuts the inner end cap 84. The positive terminal of the outer end cap 86 is coupled to the positive terminal of the inner end cap 84 using a wire, foil strip, trace, etc. Of course, the positive and negative terminals may be reversed, so that the respective negative terminals are coupled.

In a further alternative embodiment, the batteries may be mounted outside of the shade tube, and power may be provided to the components located within the shade tube using commutator or slip rings, induction techniques, and the like. Additionally, the external batteries may be replaced by any external source of DC power, such as, for example, an AC/DC power converter, a solar cell, etc.

FIGS. 9A and 9B depict exploded, isometric views of a power supply unit according to an alternative embodiment of the present invention. In this embodiment, power supply unit 80 includes a housing 95 with one or more bearings 90 that are rotatably coupled to a support shaft 88, a power coupling 93 to receive power from an external power source, and positive and negative terminals to engage the electrical connector 42. Power cables 97 (shown in phantom for clarity) extend from the power coupling 93, through a hollow central portion of support shaft 88, to an external DC power source. In a preferred embodiment, housing 95 includes two low-friction rolling element bearings 90, such as, for example, spherical ball bearings; each outer race is attached to the housing 95, while each inner race is attached to the support shaft 88. Other types of low-friction bearings are also contemplated by the present invention. Housing 95 may be formed from two complementary sections, fixed or removably joined by one or more screws, rivets, etc.

In one embodiment, the support shafts 88 are slidingly-attached to the inner race of ball bearings 90 so that the support shafts 88 may be displaced along the rotational axis of the shade tube 32. This adjustability advantageously allows an installer to precisely attach the end of the support shafts 88 to the respective mounting bracket by adjusting the length of the exposed portion of the support shafts 88. In a preferred embodiment, outer end cap 86 and housing 95 may provide approximately 0.5" of longitudinal movement for the support shafts 88. Additionally, mounting brackets 5, 7, 15 and 17 are embossed so that the protruding portion of the mounting bracket will only contact the inner race of bearings 64 and 90 and will not rub against the edge of the shade or the shade tube 32 if the motorized roller shade 20 is installed incorrectly. In a preferred embodiment, the bearings may accommodate up to 0.125" of misalignment due to installation errors without a significant reduction in battery life.

In an alternative embodiment, the microcontroller receives control signals from a wired remote control. These control signals may be provided to the microcontroller in various ways, including, for example, over power cables 97, over additional signal lines that are accommodated by power coupling 93, over additional signal lines that are accommodated by a control signal coupling (not shown in FIG. 9A,B for clarity), etc.

Figure 10:
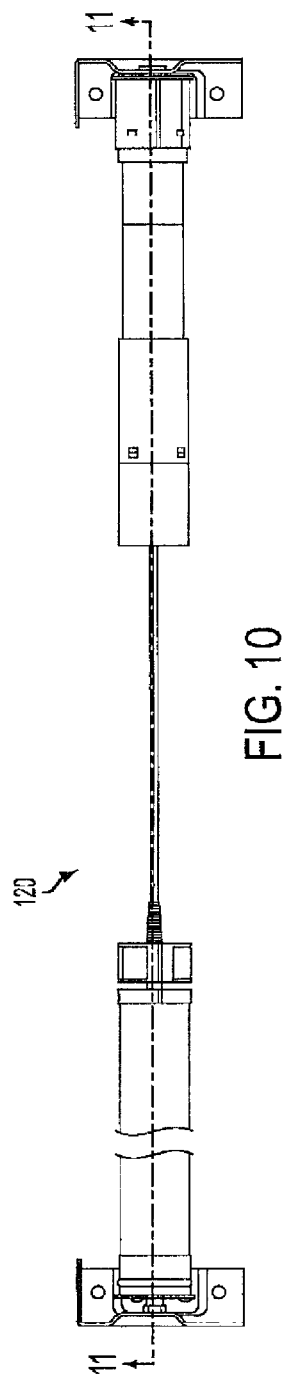
FIG. 10 presents a front view of a motorized roller shade, according to an embodiment of the present invention.
Figure 11:
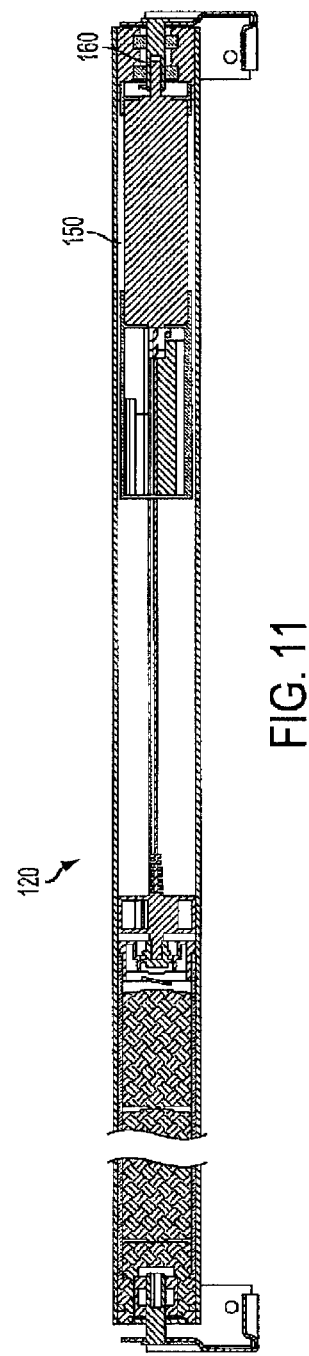
FIG. 11 presents a sectional view along the longitudinal axis of the motorized roller shade depicted in FIG. 10.
Figure 12:
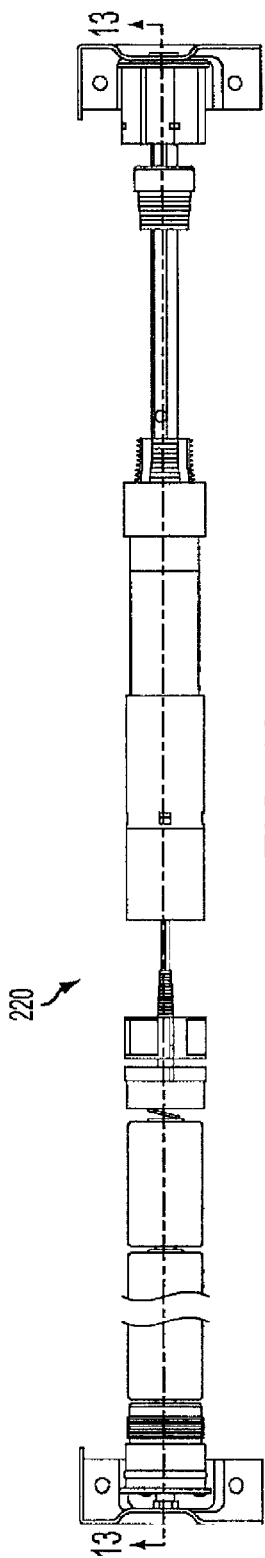
FIG. 12 presents a front view of a motorized roller shade, according to an embodiment of the present invention.
Figure 13:
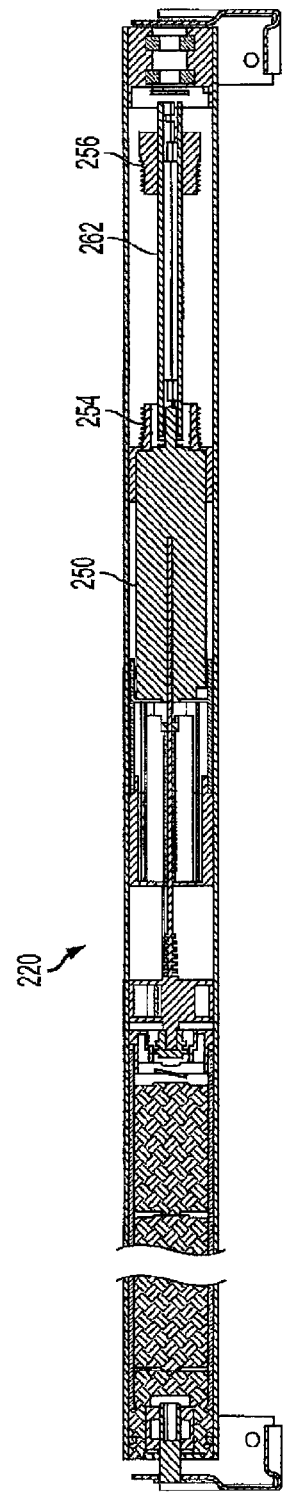
FIG. 13 presents a sectional view along the longitudinal axis of the motorized roller shade depicted in FIG. 12.
Figure 14:
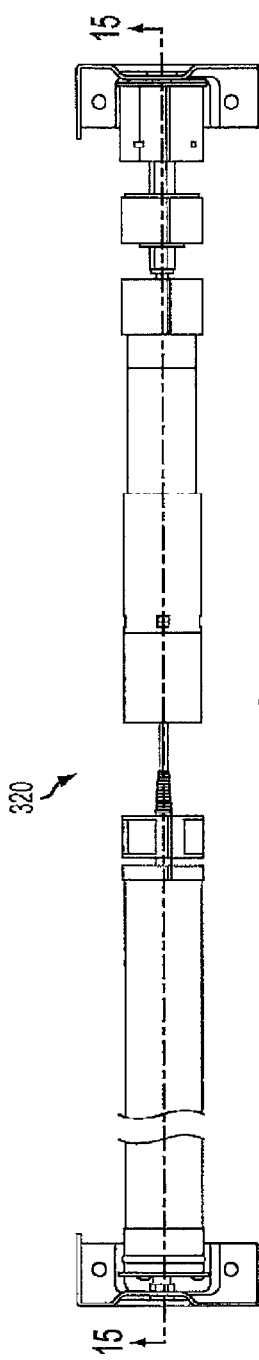
FIG. 14 presents a front view of a motorized roller shade, according to an embodiment of the present invention.
Figure 15:
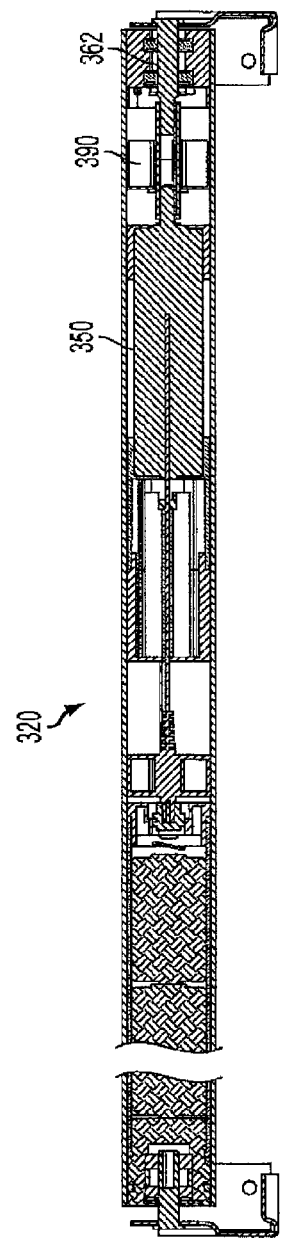
FIG. 15 presents a sectional view along the longitudinal axis of the motorized roller shade depicted in FIG. 14.
Figure 16:
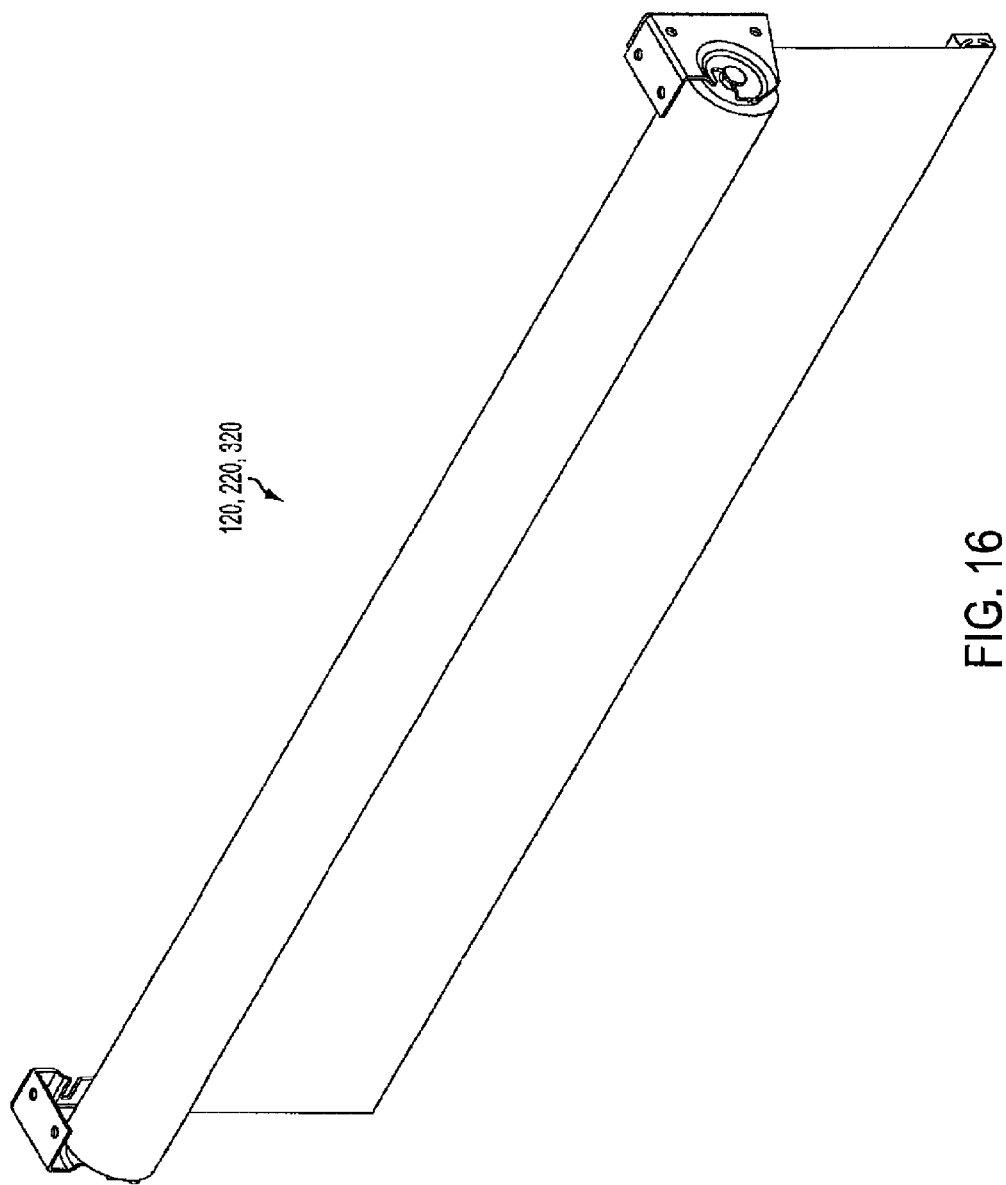
FIG. 16 presents an isometric view of a motorized roller shade assembly in accordance with the embodiments depicted in FIGS. 10-15.

Various additional embodiments of the present invention are presented in FIGS. 10-16. FIGS. 10 and 11 depict an alternative embodiment of the present invention without counterbalancing; FIG. 10 presents a front view of a motorized roller shade 120, while FIG. 11 presents a sectional view along the longitudinal axis of the motorized roller shade 120. In this embodiment, the output shaft of the DC gear motor 150 is attached to the support shaft 160, and an intermediate shaft is not included. FIGS. 12 and 13 depict an alternative embodiment of the present invention with counterbalancing; FIG. 12 presents a front view of a motorized roller shade 220, while FIG. 13 presents a sectional view along the longitudinal axis of the motorized roller shade 220. In this embodiment, the output shaft of the DC gear motor 250 is attached to the intermediate shaft 262, and a counterbalance spring (not shown for clarity) couples rotating perch 254 to fixed perch 256. FIGS. 14 and 15 depict an alternative embodiment of the present invention with counterbalancing; FIG. 14 presents a front view of a motorized roller shade 320, while FIG. 15 presents a sectional view along the longitudinal axis of the motorized roller shade 320. In this embodiment, the output shaft of the DC gear motor 350 is attached to the intermediate shaft 362. A power spring 390 couples the intermediate shaft 362 to the inner surface of the shade tube 332. FIG. 16 presents an isometric view of a motorized roller shade assemblies 120, 220, 320 in accordance with the embodiments depicted in FIGS. 10-15.

Motorized roller shade 20 may be controlled manually and/or remotely using a wireless or wired remote control. Generally, the microcontroller executes instructions stored in memory that sense and control the motion of DC gear motor 55, decode and execute commands received from the remote control, monitor the power supply voltage, etc. More than one remote control may be used with a single motorized roller shade 20, and a single remote control may be used with more than one motorized roller shade 20.

Figure 17:
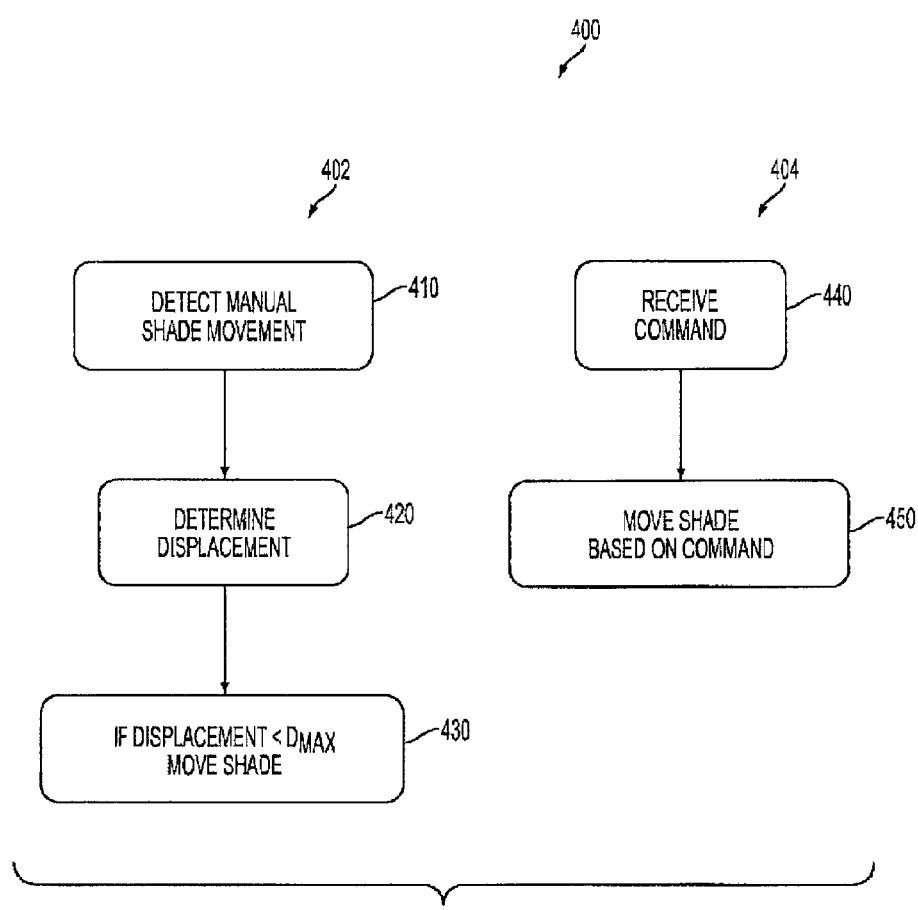
FIG. 17 presents a method 400 for controlling a motorized roller shade 20, according to an embodiment of the present invention.

FIG. 17 presents a method 400 for controlling a motorized roller shade 20, according to an embodiment of the present invention. Generally, method 400 includes a manual control portion 402 and a remote control portion 404. In one embodiment, method 400 includes the manual control portion 402, in another embodiment, method 400 includes the remote control portion 404, and, in a preferred embodiment, method 400 includes both the manual control portion 402 and the remote control portion 404.

During the manual control portion 402 of method 400, a manual movement of the shade 22 is detected (410), a displacement associated with the manual movement is determined (420), and, if the displacement is less than a maximum displacement, the shade 22 is moved (430) to a different position by rotating the shade tube 32 using the DC gear motor 55.

In one embodiment, the microcontroller detects a manual downward movement of the shade 22 by monitoring a reed switch, while in an alternative embodiment, the microcontroller simply monitors the encoder. In a preferred embodiment, after the initial downward movement or tug is detected by the reed switch, the microcontroller begins to count the encoder pulses generated by the rotation of the shade tube 32 relative to the fixed motor shaft 51. When the encoder pulses cease, the downward movement has stopped, and the displacement of the shade 22 is determined and then compared to a maximum displacement. In one embodiment, the shade displacement is simply the total number of encoder pulses received by the microcontroller, and the maximum displacement is a predetermined number of encoder pulses. In another embodiment, the microcontroller converts the encoder pulses to a linear distance, and then compares the calculated linear distance to a maximum displacement, such as 2 inches.

In one example, the maximum number of encoder pulses is 80, which may represent approximately 2 inches of linear shade movement in certain embodiments. If the total number of encoder pulses received by the microcontroller is greater than or equal to 80, then the microcontroller does not energize the DC gear motor 55 and the shade 22 simply remains at the new position. On the other hand, if the total number of encoder pulses received by the microcontroller is less than 80, then the microcontroller moves the shade 22 to a different position by energizing the DC gear motor 55 to rotate the shade tube 32. After the microcontroller determines that the shade 22 has reached the different position, the DC gear motor 55 is de-energized.

In preferred embodiments, the microcontroller maintains the current position of the shade 22 by accumulating the number of encoder pulses since the shade 22 was deployed in the known position. As described above, the known (e.g., open) position has an accumulated pulse count of 0, and the various intermediate positions each have an associated accumulated pulse count, such as 960, 1920, etc. When the shade 22 moves in the downward direction, the microcontroller increments the accumulated pulse counter, and when the shade 22 moves in the upward direction, the microcontroller decrements the accumulated pulse counter. Each pulse received from the encoder increments or decrements the accumulated pulse counter by one count. Of course, the microcontroller may convert each pulse count to a linear distance, and perform these calculations in units of inches, millimeters, etc.

In a preferred embodiment, limited manual downward movement of the shade 22 causes the microcontroller to move the shade to a position located directly above the current position, such as 25% open, 50% open, 75% open, 100% open, etc. Each of these predetermined positions has an associated accumulated pulse count, and the microcontroller determines that the shade 22 has reached the different position by comparing the value in the accumulated pulse counter to the accumulated pulse count of the predetermined position; when the accumulated pulse counter equals the predetermined position accumulated pulse count, the shade 22 has reached the different position.

Other sets of predetermined positions are also contemplated by the present invention, such as 0% open, 50% open, 100% open; 0% open, 33% open, 66% open, 100% open; 0% open, 10% open, 20% open, 30% open, 40% open, 50% open, 60% open, 70% open, 80% open, 90% open, 100% open; etc. Advantageously, the accumulated pulse count associated with each position may be reprogrammed by the user to set one or more custom positions.

Manual upward movement of the shade 22 may be detected and measured using an encoder that senses direction as well as rotation, such as, for example, an incremental rotary encoder, a relative rotary encoder, a quadrature encoder, etc. In other embodiments, limited upward movement of the shade 22 causes the microcontroller to move the shade to a position located above the current position, etc.

During the remote control portion 404 of method 400, a command is received (440) from a remote control, and the shade 22 is moved (450) to a position associated with the command.

In preferred embodiments, the remote control is a wireless transmitter that has several shade position buttons that are associated with various commands to move the shade 22 to different positions. The buttons activate switches that may be electro-mechanical, such as, for example, momentary contact switches, etc, electrical, such as, for example, a touch pad, a touch screen, etc. Upon activation of one of these switches, the wireless transmitter sends a message to the motorized roller shade 20 that includes a transmitter identifier and a command associated with the activated button. In preferred embodiments, the remote control is pre-programmed such that each shade position button will command the shade to move to a predetermined position. Additionally, remote control functionality may be embodied within a computer program, and this program may be advantageously hosted on a wireless device, such as an iPhone. The wireless device may communicate directly with the motorized roller shade 20, or through an intermediate gateway, bridge, router, base station, etc.

In these preferred embodiments, the motorized roller shade 20 includes a wireless receiver that receives, decodes and sends the message to the microcontroller for further processing. The message may be stored within the wireless transmitter and then sent to the microcontroller immediately after decoding, or the message may be sent to the microcontroller periodically, e.g., upon request by the microcontroller, etc. One preferred wireless protocol is the Z-Wave Protocol, although other wireless communication protocols are contemplated by the present invention.

After the message has been received by the microcontroller, the microcontroller interprets the command and sends an appropriate control signal to the DC gear motor 55 to move the shade in accordance with the command. As discussed above, the DC gear motor 55 and shade tube 32 rotate together, which either extends or retracts the shade 22. Additionally, the message may be validated prior to moving the shade, and the command may be used during programming to set a predetermined deployment of the shade.

For example, if the accumulated pulse counter is 3840 and the shade 22 is 0% open, receiving a 50% open command will cause the microcontroller to energize the DC gear motor 55 to move the shade 22 upwards to this commanded position. As the shade 22 is moving, the microcontroller decrements the accumulated pulse counter by one count every time a pulse is received from the encoder, and when the accumulated pulse counter reaches 1920, the microcontroller de-energizes the DC gear motor 55, which stops the shade 22 at the 50% open position. In one embodiment, if a different command is received while the shade 22 is moving, the microcontroller may stop the movement of the shade 22. For example, if the shade 22 is moving in an upward direction and a close (0% open) command is received, the microcontroller may de-energize the DC gear motor 55 to stop the movement of the shade 22. Similarly, if the shade 22 is moving in a downward direction and a 100% open command is received, the microcontroller may de-energize the DC gear motor 55 to stop the movement of the shade 22. Other permutations are also contemplated by the present invention, such as moving the shade 22 to the predetermined position associated with the second command, etc.

In a preferred embodiment, a command to move the shade to the 100% open position resets the accumulated pulse counter to 0, and the microcontroller de-energizes the DC gear motor 55 when the encoder pulses cease. Importantly, an end-of-travel stop, such as bottom bar 28, stops 24 and 26, and the like, engage corresponding structure on the mounting brackets when the shade 22 has been retracted to the 100% open position. This physical engagement stops the rotation of the shade tube 32 and stalls the DC gear motor 55. The microcontroller senses that the encoder has stopped sending pulses, e.g., for one second, and de-energizes the DC gear motor 55. When the shade 22 is moving in the other direction, the microcontroller may check an end-of-travel pulse count in order to prevent the shade 22 from extending past a preset limit.

In other embodiments, the movement of the shade 22 may simply be determined using relative pulse counts. For example, if the current position of the shade 22 is 100% open, and a command to move the shade 22 to the 50% open position is received, the microcontroller may simply energize the DC gear motor 55 until a certain number of pulses have been received, by the microcontroller, from the encoder. In other words, the pulse count associated with predetermined position is relative to the predetermined position located directly above or below, rather than the known position.

Figure 18:
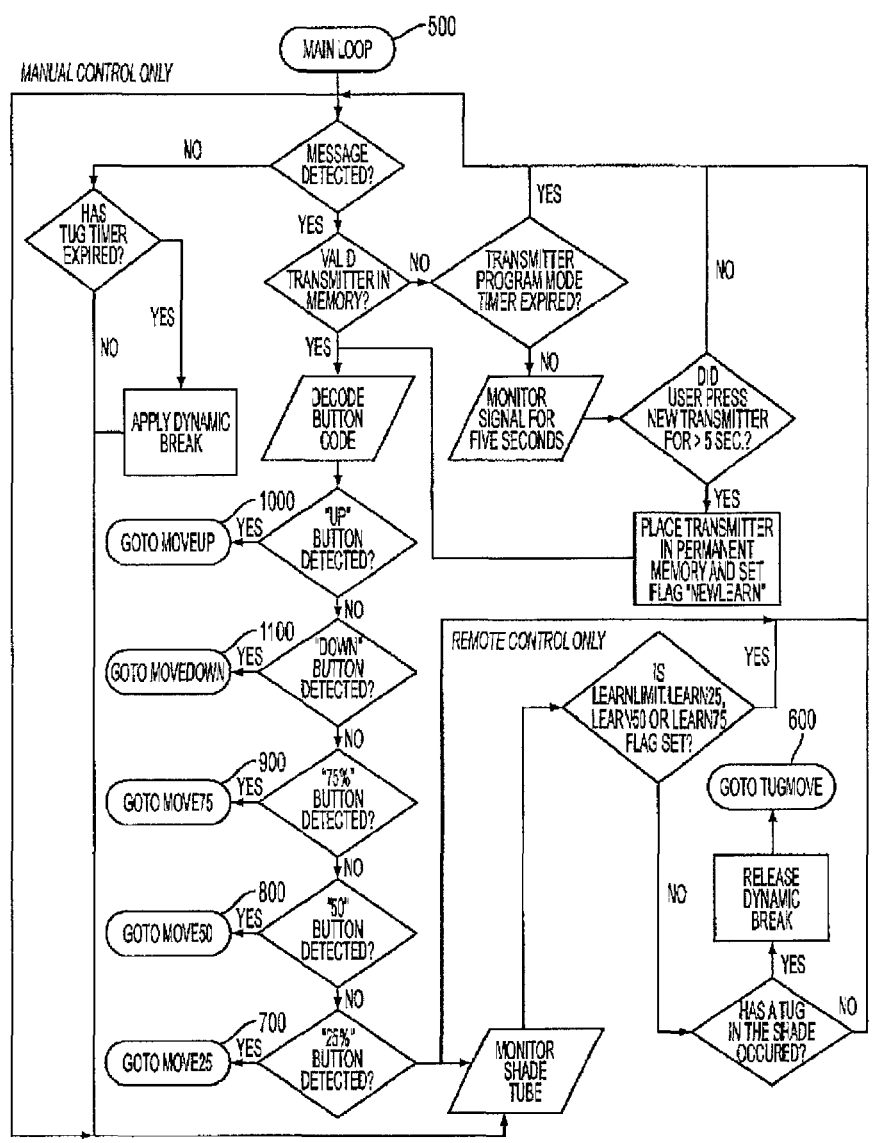
FIGS. 18 to 25 present operational flow charts illustrating various preferred embodiments of the present invention.
Figure 19:
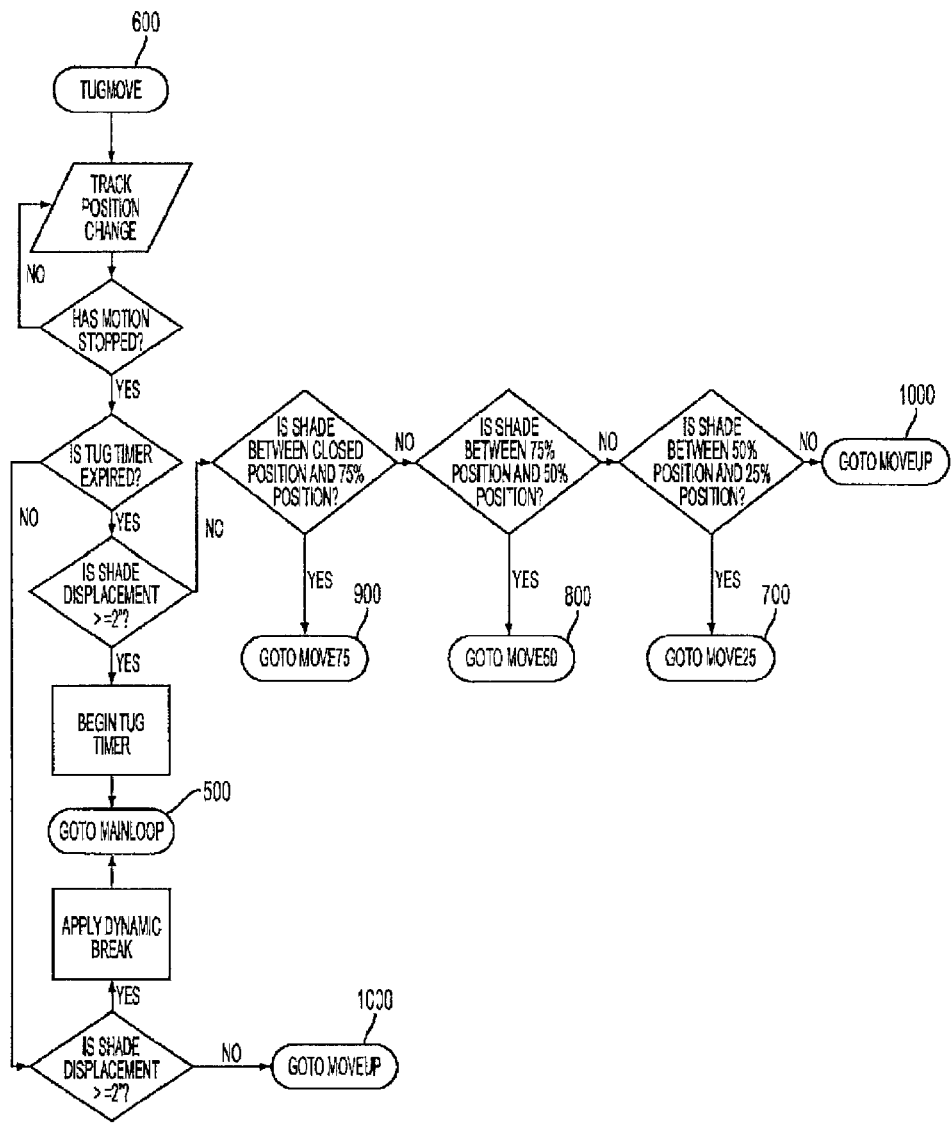
Figure 20:
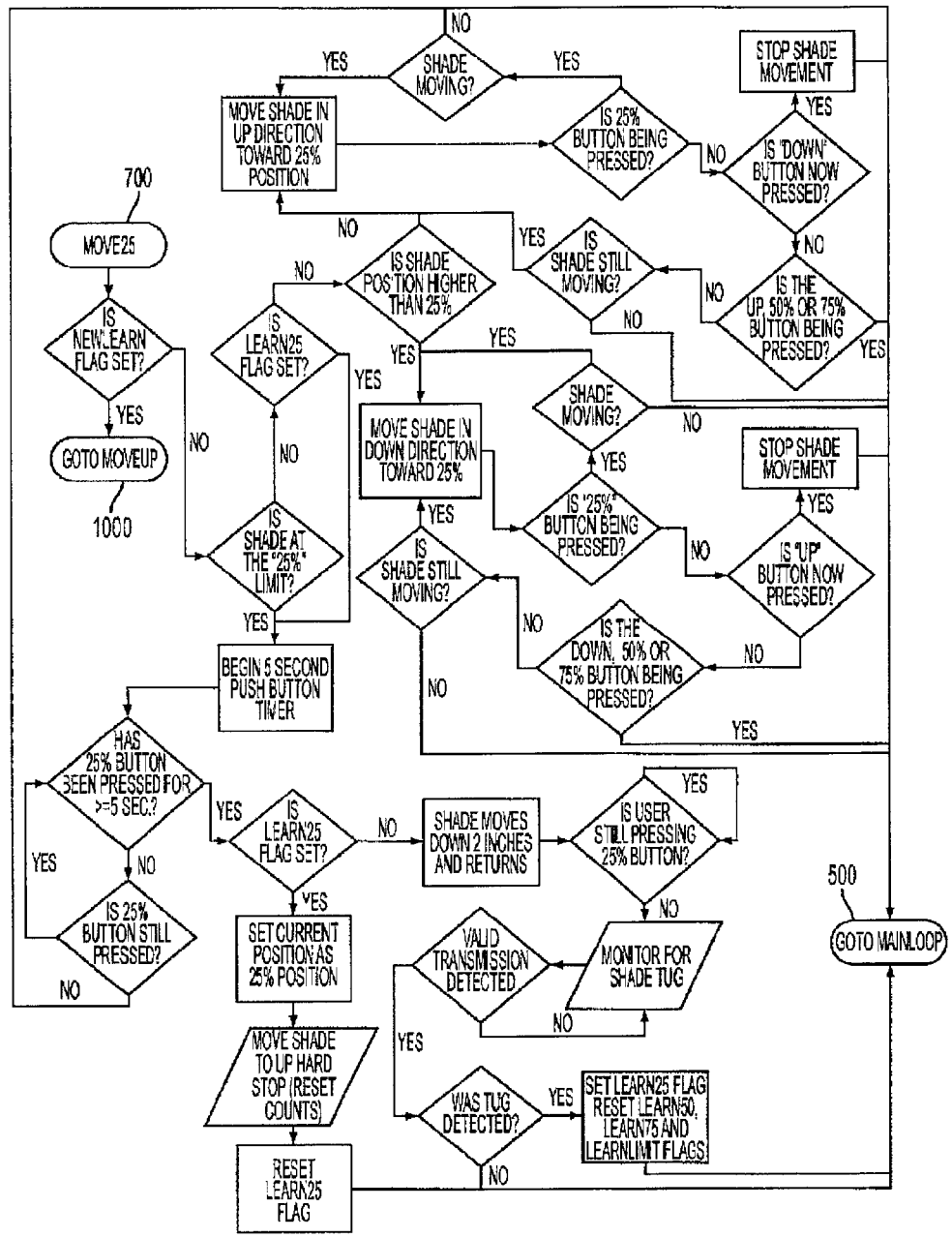
Figure 21:
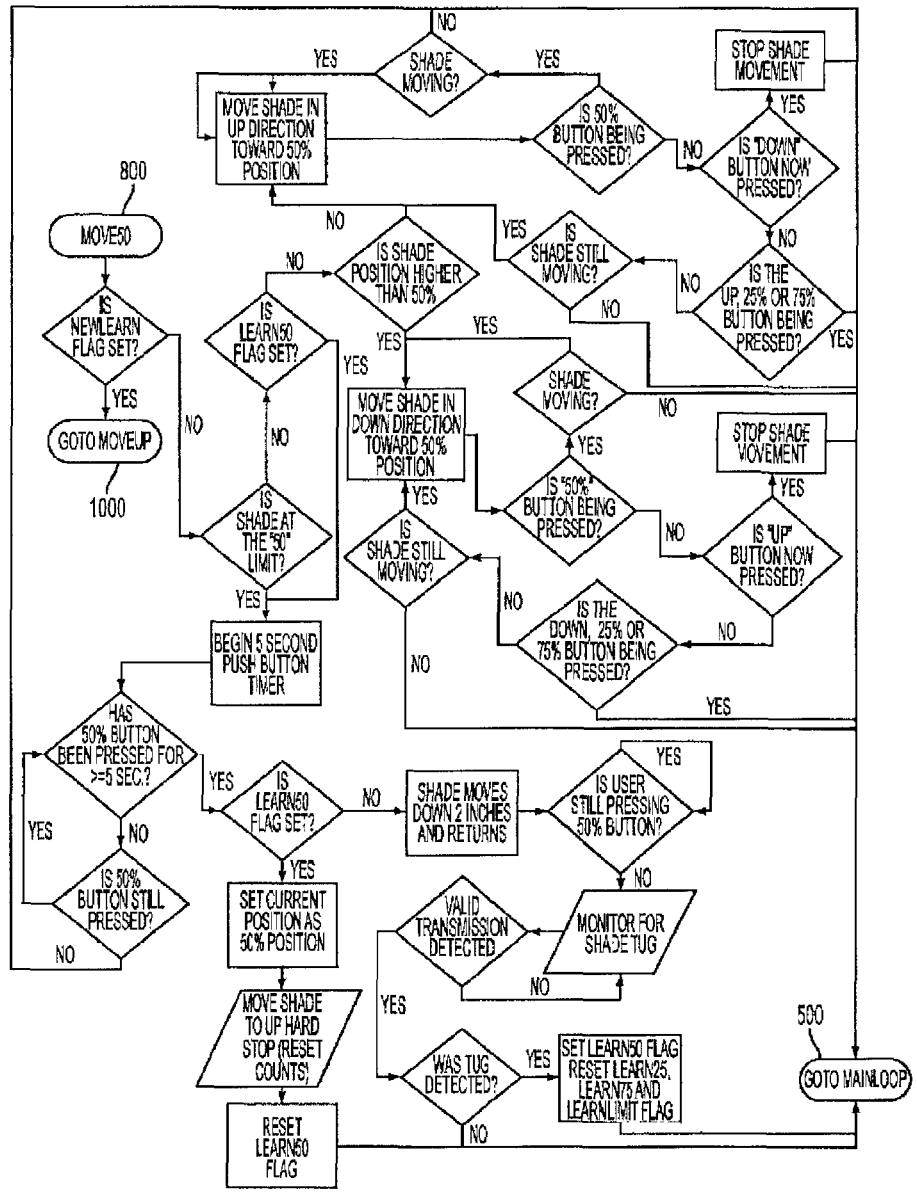
Figure 22:
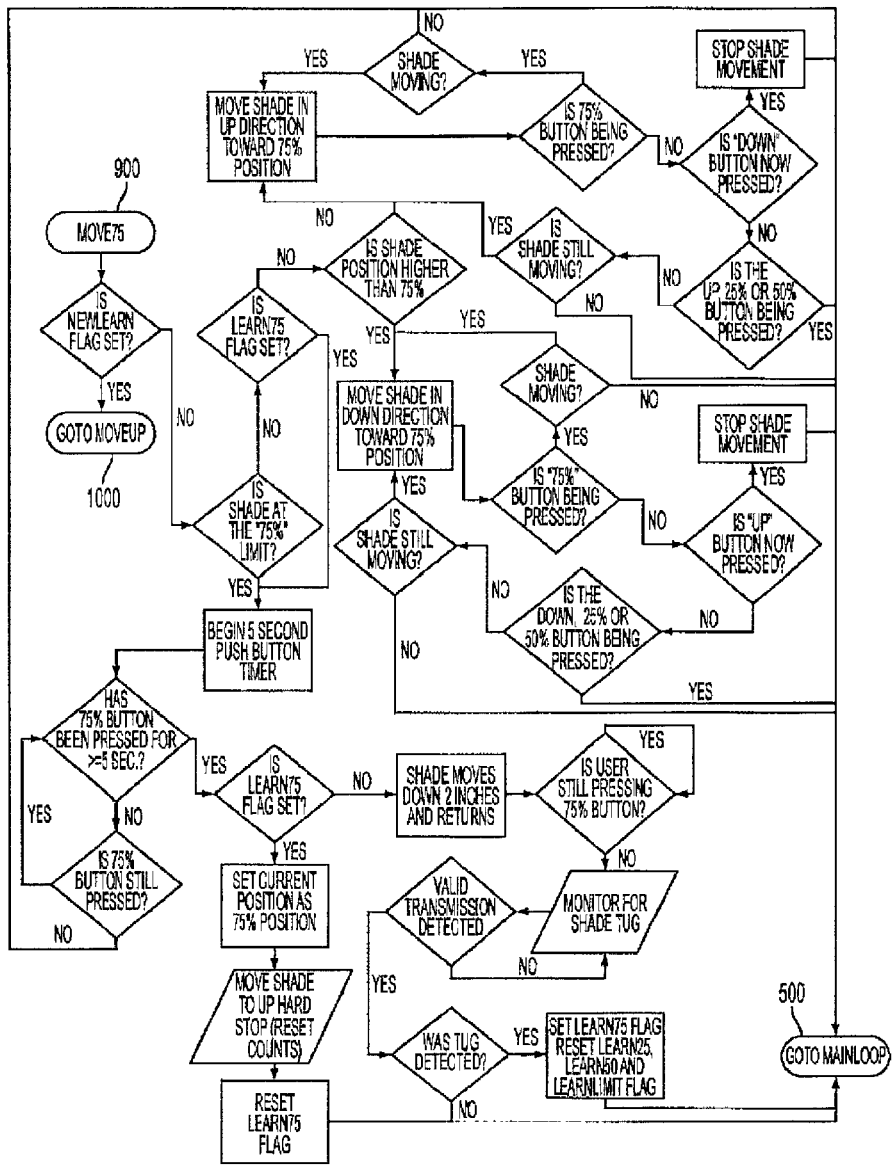
Figure 23:
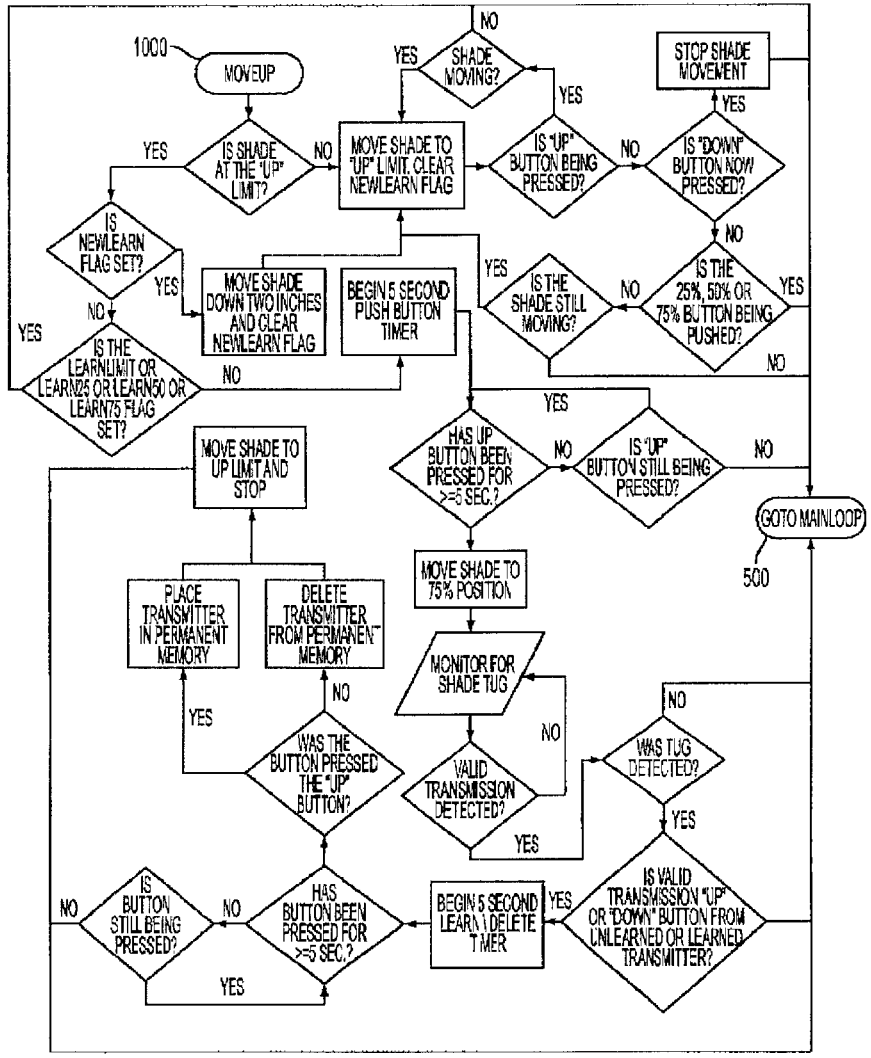
Figure 24:
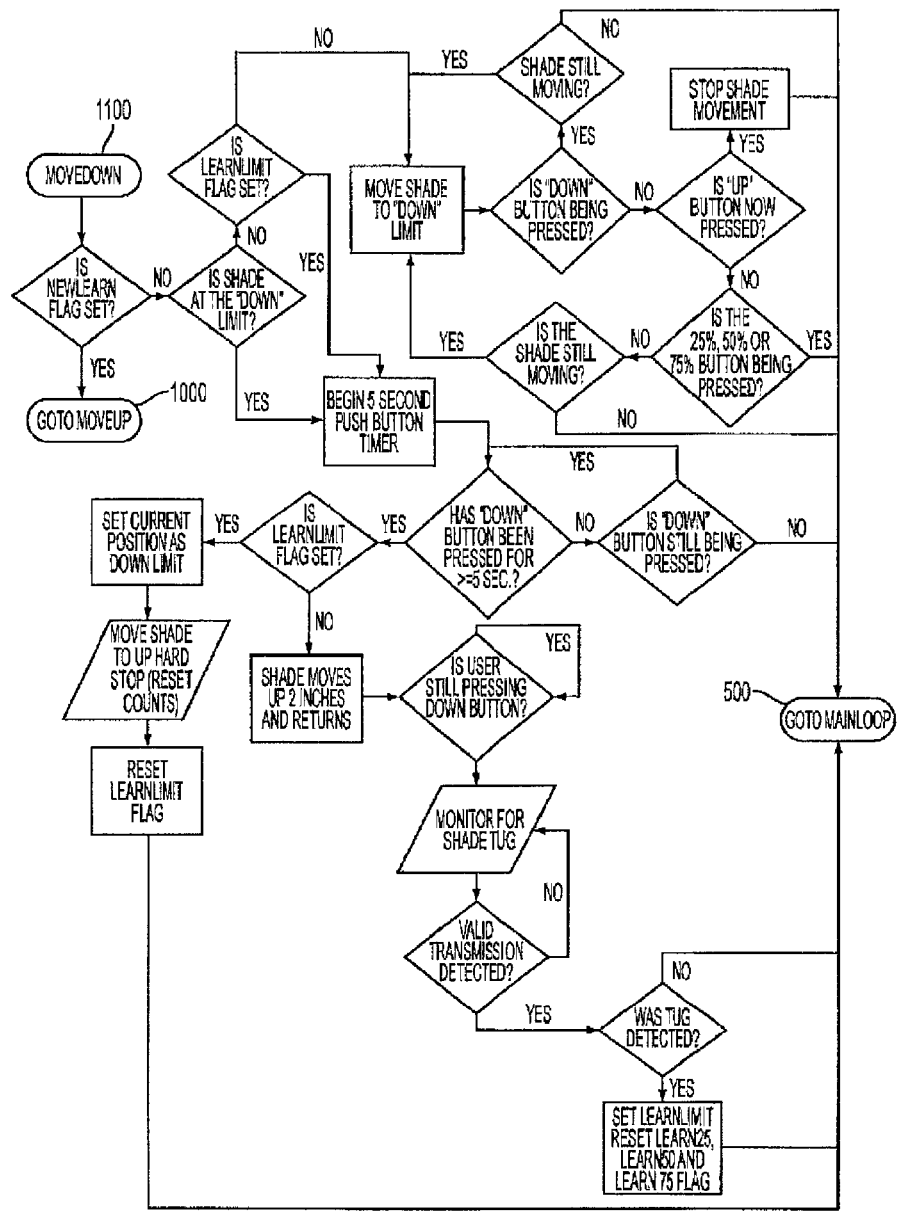
Figure 25:
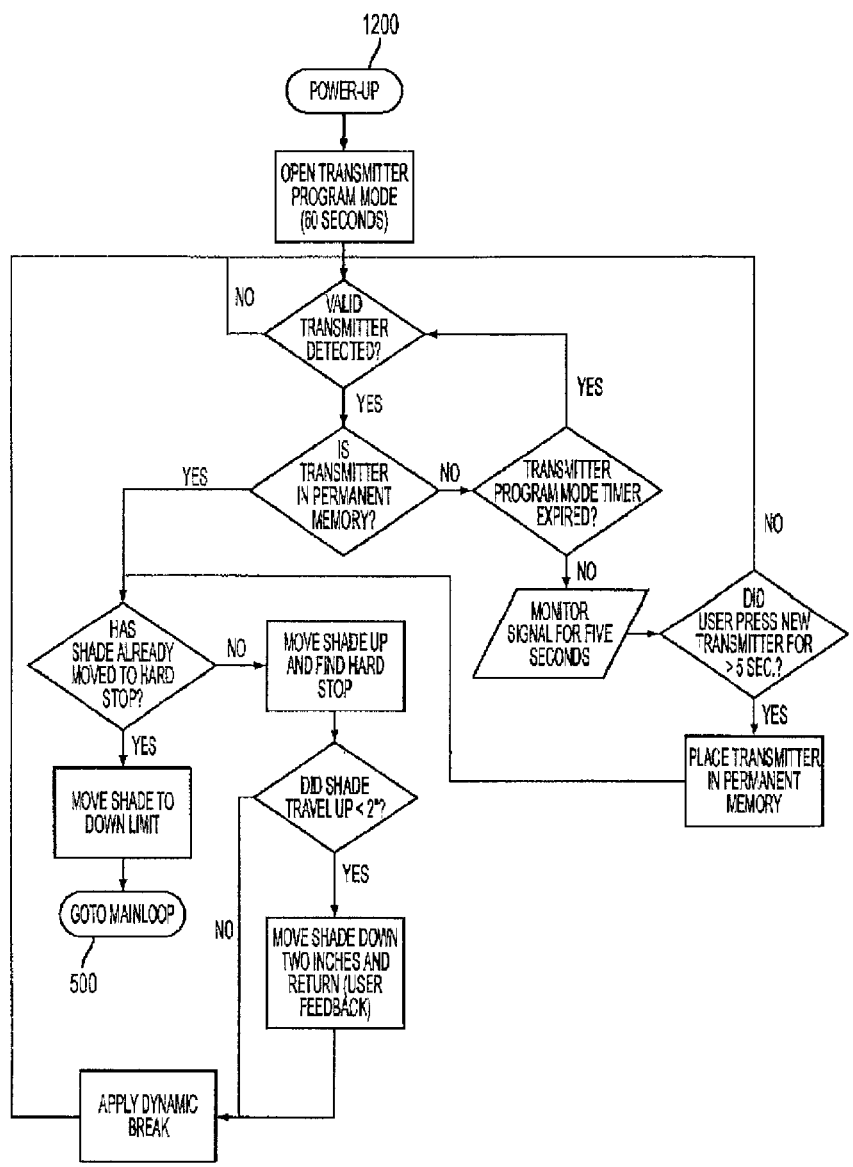

For the preferred embodiment, programming a motorized roller shade 20 to accept commands from a particular remote control depicted in FIGS. 18 and 25, while programming or teaching the motorized roller shade 20 to deploy and retract the shade 22 to various preset or predetermined positions, such as open, closed, 25% open, 50% open, 75% open, etc., is depicted in FIGS. 20 to 24. Other programming methodologies are also contemplated by the present invention.

In other embodiments, a brake may be applied to the motorized roller shade 20 to stop the movement of the shade 22, as well as to prevent undesirable rotation or drift after the shade 22 has been moved to a new position. In one embodiment, the microcontroller connects the positive terminal of the DC gear motor 55 to the negative terminal of DC gear motor 55, using one or more electro-mechanical switches, power FETS, MOSFETS, etc., to apply the brake. In another embodiment, the positive and negative terminals of the DC gear motor 55 may be connected to ground, which may advantageously draw negligible current. In a negative ground system, the negative terminal of the DC gear motor 55 is already connected to ground, so the microcontroller only needs to connect the positive terminal of the DC gear motor 55 to ground. Conversely, in a positive ground system, the positive terminal of the DC gear motor 55 is already connected to ground, so the microcontroller only needs to connect the negative terminal of the DC gear motor 55 to ground.

Once the positive and negative terminals of the DC gear motor 55 are connected, as described above, any rotation of the shade tube 32 will cause the DC gear motor 55 to generate a voltage, or counter electromotive force, which is fed back into the DC gear motor 55 to produce a dynamic braking effect. Other braking mechanisms are also contemplated by the present invention, such as friction brakes, electro-mechanical brakes, electro-magnetic brakes, permanent-magnet single-face brakes, etc. The microcontroller releases the brake after a manual movement of the shade 22 is detected, as well as prior to energizing the DC gear motor 55 to move the shade 22.

In an alternative embodiment, after the shade 22 has been moved to the new position, the positive or negative terminal of the DC gear motor 55 is connected to ground to apply the maximum amount of braking force and bring the shade 22 to a complete stop. The microcontroller then connects the positive and negative terminals of the DC gear motor 55 together via a low-value resistor, using an additional MOSFET, for example, to apply a reduced amount of braking force to the shade 22, which prevents the shade 22 from drifting but allows the user to tug the shade 22 over long displacements without significant resistance. In this embodiment, the brake is not released after the manual movement of the shade is detected in order to provide a small amount of resistance during the manual movement.

FIGS. 18 to 25 present operational flow charts illustrating preferred embodiments of the present invention. The functionality illustrated therein is implemented, generally, as instructions executed by the microcontroller. FIG. 18 depicts a Main Loop 500 that includes a manual control operational flow path, a remote control operational flow path, and a combined operational flow path. Main Loop 500 exits to various subroutines, including subroutine "TugMove" 600 (FIG. 19), subroutine "Move25" 700 (FIG. 20), subroutine "Move50" 800 (FIG. 21), subroutine "Move75" 900 (FIG. 22), subroutine "MoveUp" 1000 (FIG. 23), subroutine "MoveDown" 1100 (FIG. 24), which return control to Main Loop 500. Subroutine "Power-Up" 1200 (FIG. 25) is executed upon power up, and then exits to Main Loop 500.

One example of a motorized roller shade 20 according to various embodiments of the present invention is described hereafter. The shade tube 32 is an aluminum tube having an outer diameter of 1.750 inches and a wall thickness of 0.062 inches. Bearings 64 and 90 each include two steel ball bearings, 30 mm OD.times.10 mm ID.times.9 mm wide, that are spaced 0.250" apart. In other words, a total of four ball bearings, two at each end of the motorized roller shade 20, are provided.

The DC gear motor 55 is a Buhler DC gear motor 1.61.077.423, as discussed above. The battery tube 82 accommodates 6 to 8 D-cell alkaline batteries, and supplies voltages ranges from 6 V to 12 V, depending on the number of batteries, shelf life, cycles of the shade tube assembly, etc. The shade 22 is a flexible fabric that is 34 inches wide, 60 inches long, 0.030 inches thick and weighs 0.100 lbs/sq. ft, such as, for example, Phifer Q89 Wicker/Brownstone. An aluminum circularly-shaped curtain bar 28, having a diameter of 0.5 inches, is attached to the shade 22 to provide taughtness as well as an end-of-travel stop. The counterbalance spring 63 is a clock spring that provides 1.0 to 1.5 in-lb of counterbalance torque to the shade 22 after it has reached 58 inches of downward displacement. In this example, the current drawn by the Buihler DC gear motor ranges between 0.06 and 0.12 amps, depending on friction.

Figure 28:
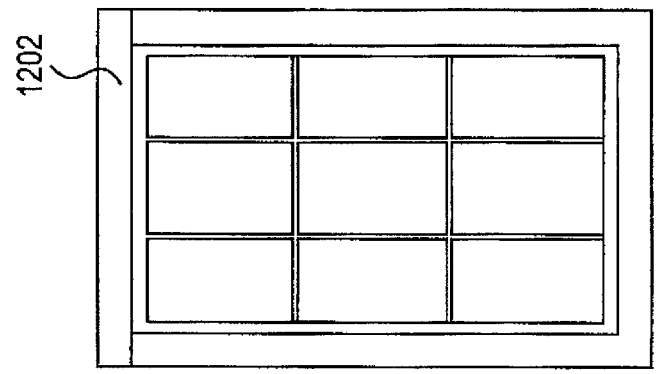
FIG. 28 is a plan view of the window or roller shade assembly depicted in FIGS. 26 and 27 wherein the shade assembly is deployed to third or open position.
Figure 27:
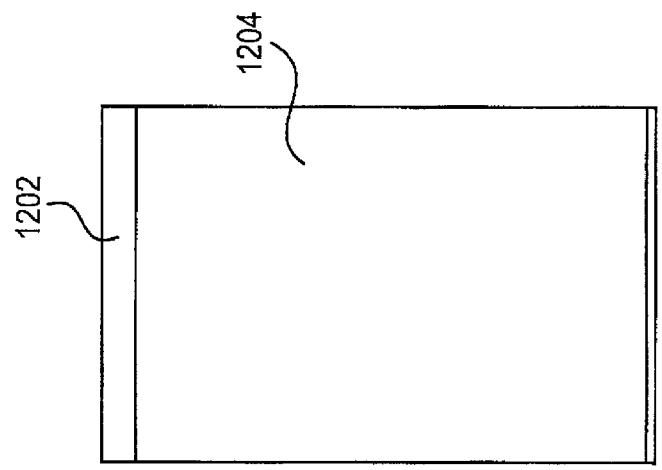
FIG. 27 is a plan view of the window and roller shade assembly depicted in FIG. 26 wherein the roller shade assembly is deployed in a second or closed position.
Figure 26:
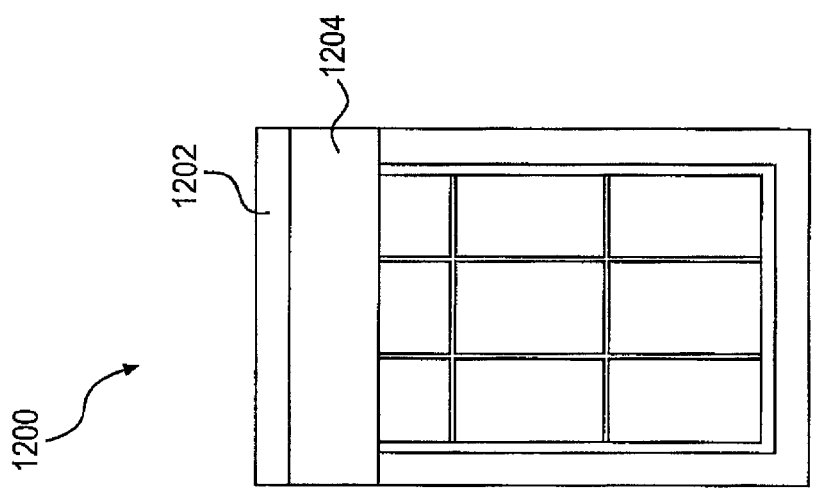
FIG. 26 is a plan view of a window with a roller shade assembly in accordance with an embodiment of the present invention wherein the shade assembly is deployed in a first position.

Turning now to FIGS. 26-28, a schematic view of a window, generally designated 1200 is illustrated, wherein the window 1200 has a blind or shade assembly 1202 mounted thereto having a shade or blind 1204. Referring now specifically to FIG. 26, the blind or shade assembly 1202 has the shade or blind 1024 deployed in a first position whereas FIG. 27 depicts the shade or blind assembly 1202 wherein the shade or blind 1204 is fully deployed to the closed position, covering the window 1200. FIG. 28 depicts the shade or blind assembly 1202 wherein the shade or blind 1204 is in a third, fully open position. The aforementioned figures and corresponding positions will be discussed further in connection with FIGS. 29 and 30.

Figure 29:
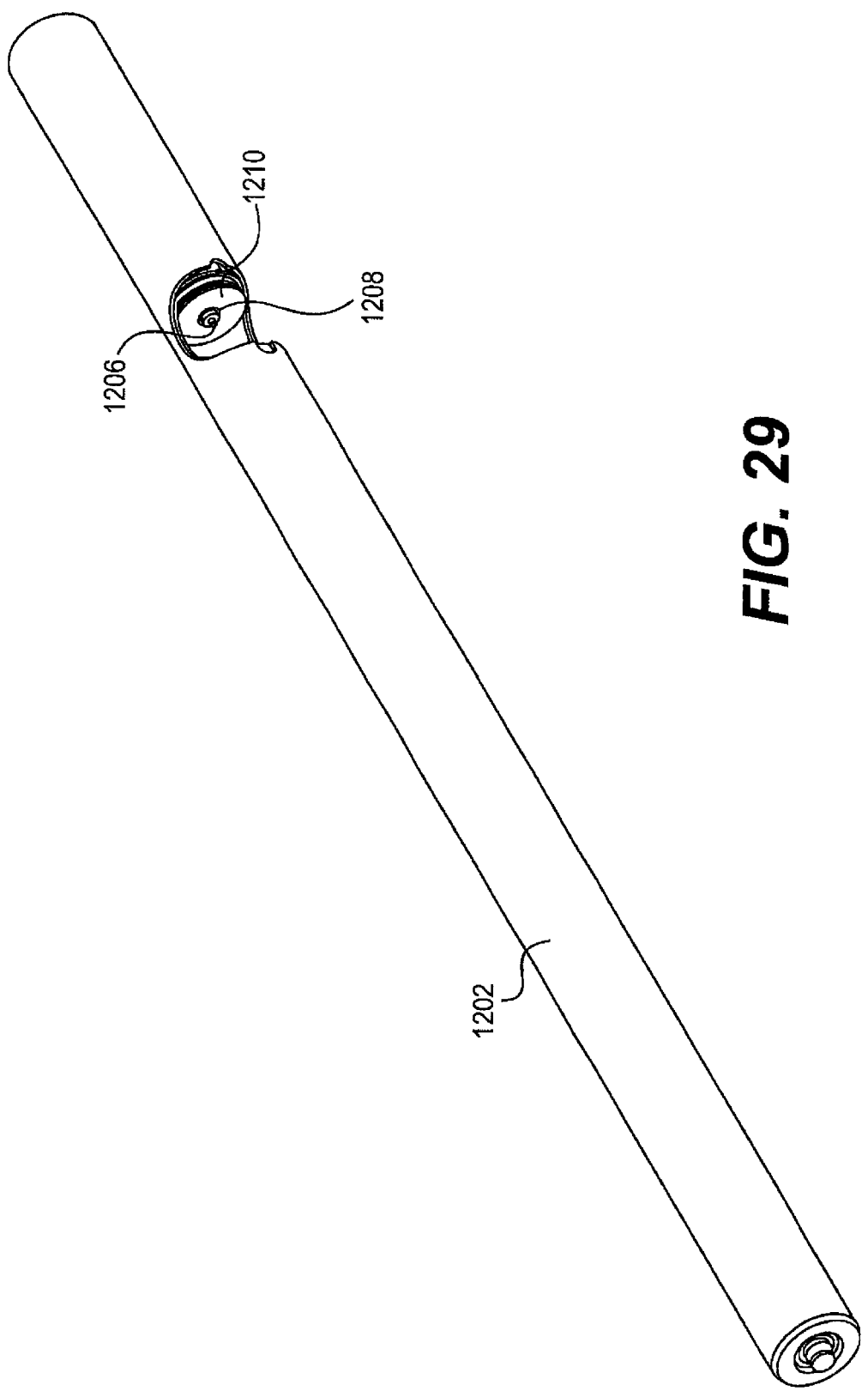
FIG. 29 is a perspective or cutaway view of a roller shade assembly illustrating the FIG. 30 in an enlarged perspective view of the roller shade assembly depicted in FIG. 29.

Turning now to FIGS. 29 and 30, the roller shade or blind assembly 1202 is depicted in accordance with the embodiments of the present invention described herein. As illustrated in FIGS. 29 and 30, the roller or shade assembly 1202 includes a motor (not shown) having an output shaft 1206 extending therefrom. A Hall Effect magnet wheel 1208 is mounted to said output shaft 1206. The roller shade or blind assembly 1202 also comprises a Hall Effect sensor as part of a printed circuit board 1210. Alternatively, the roller shade or blind assembly 1202 may employ a chopper wheel wherein an optical encoder is mounted to the printed circuit board 1210 instead of the above-discussed Hall Effect magnet wheel and sensor. Moreover, the roller shade or blind assembly 1202 may alternatively employ a magnetic reed witch or a potentiometer.

The roller shade or blind assembly 1202 includes a microprocessor (not shown) as previously discussed, which is mounted to a second printed circuit board 1212. The microprocessor is electrically connected to the power supply and the first printed circuit board 1210.

During operation, once the shade or blind assembly 1202 is installed and energized or otherwise powered up, the shade or blind 1204 will be able to move or translate to a predetermined position. One preferred distance is about 12 inches (30.5 cm) but it can be any desired distance/position in the path of travel of the shade or blind 1204, for example as illustrated in FIG. 26. The aforementioned translations of the shade or blind 1204 may be automatic from a time out command after energizing the power supply or a manual movement of the shade or blind 1204, such as a tug, or a depression of a button on a remote transmitter. Once the shade or blind 1204 is deployed to the position as described above, the motorized shade or blind assembly 1202 is now positioned for further user response and input. The user may now manually pull the shade or blind 1204 to the fully closed position as depicted in FIG. 27.

Next, the control unit may proceed to time out and translate of move the shade or blind 1204 to a third or fully open position as depicted in FIG. 28. The aforementioned last movement or translation is typically automatic by means of a countdown timer but alternatively could be initiated by a transmitter or a short tug on the shade or blind 1204. In one embodiment, the described setup would likely be performed each time the power supply is energized and in said embodiment, may occur automatically if for some reason the Hall Effect sensor 1210 lost count causing a hard stop.

The upper limit hard stop, as previously mentioned, at the top of the roller shade travel is utilized to re-sync the encoder count by detecting the upper travel limit. The use of "absolute encoders" is permitted as well as "non-absolute encoders" which must be recalibrated or re-synced to an encoder zero position as desired, in this case the hard stop at the top. Over time, an encoder might become slightly out of sync with the actual shade position causing the shade assembly to not function correctly or as desired. This described occurrence can easily happen when the reed switch is falsely triggered by the encoder magnet rocking or oscillating due to motor and fabric and spring working against each other at some position of travel. One may correct this "out of sync condition" forcing a hard stop every certain amount of cycles to re-sync said encoder. Please note the number of cycles is an arbitrary number and can be any desired or needed value. The aforementioned syncing process is preferred as it is undesireable to take an energy hit by stalling the motor every time the blind or shade 1204 is retracted all the way and it is undesirable to introduce noise. e.g., clank, etc., by having the bottom bar of the blind or shade, for example, hit the hard stop every time the blind or shade 1204 is refracted.

In one example for setting a custom upper limit during the setup, the end user may use a lower starting position for the blind or shade 1204 as one of the intermediate positions. So, for instance, if the end user were to tug on the blind or shade 1204 to propel it to the top, the end user may alternatively stop at an intermediate position to allow for the blind or shade 1204 to be more easily accessible. Since the intermediate positions are programmable, an end user may set the upper height to whatever "artificial top" desired or preferred.

The many features and advantages of the invention are apparent from the detailed specification, and, thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and, accordingly, all suitable modifications and equivalents may be resorted to that fall within the scope of the invention.

What is claimed is:
1. A motorized window shade system comprising:
    shade material;
    the shade material extending a length from an upper end to a lower end;
    a DC electric motor;
    the shade material operatively connected to the motor such that operation of the motor changes the position of the shade material;
    a gear reducing assembly operatively connected to the motor;
    a motor controller operatively connected to the motor;
    the motor controller configured to control operation of the motor;
    an antenna operatively connected to the motor controller;
    a power supply electrically connected to the motor;
    wherein the power supply includes at least one battery;
    a housing;
    wherein the motor, the gear reducing assembly and the power supply are positioned within the housing;
    a remote control device wirelessly connected to the antenna;
    wherein the shade material is movable to a different position by transmitting a wireless signal to the motorized window shade system using the remote control device;

a counterbalance assembly;
   the counterbalance assembly operatively connected to the motorized window shade system;
   wherein the counterbalance assembly is configured to provide a counterbalance force.

2. The motorized window shade system of claim 1 wherein the housing is formed in a generally cylindrical or tubular shape.

3. At motorized window shade system comprising:
shade material;
the shade material extending a length from an upper end to a lower end;
a DC electric motor;
the shade material operatively connected to the motor such that operation of the motor changes the position of the shade material;
a gear reducing assembly operatively connected to the motor;
a motor controller operatively connected to the motor;
the motor controller configured to control operation of the motor;
an antenna operatively connected to the motor controller;
a power supply electrically connected to the motor;
wherein the power supply includes at least one battery;
a housing;
wherein the motor, the gear reducing assembly and the power supply are positioned within the housing,
a remote control device wirelessly connected to the antenna;
wherein the shade material is movable to a different position by transmitting a wireless signal to the motorized window shade system using the remote control device;
wherein the shade material is further movable to a different position by a tug, which is a manual displacement less than a predetermined maximum displacement.

4. A motorized window shade system comprising:
shade material;
the shade material extending a length from an upper end to a lower end;
a DC electric motor;
the shade material operatively connected to the motor such that operation of the motor changes the position of the shade material;
a gear reducing assembly operatively connected to the motor;
a motor controller operatively connected to the motor;
the motor controller configured to control operation of the motor;
an antenna operatively connected to the motor controller;
a power supply electrically connected to the motor;
wherein the power supply includes at least one battery;
a housing;
wherein the motor, the gear reducing assembly and the power supply are positioned within the housing;
a remote control device wirelessly connected to the antenna;
wherein the shade material is movable to a different position by transmitting a wireless signal to the motorized window shade system using the remote control device;
wherein the shade material is further movable to a different position by a manual movement, wherein a manual movement is a manual displacement greater than a predetermined maximum displacement.

5. A motorized window shade system comprising:
shade material;
the shade material extending a length from an upper end to a lower end;
a DC electric motor;
the shade material operatively connected to the motor such that operation of the motor changes the position of the shade material;
a gear reducing assembly operatively connected to the motor;
a motor controller operatively connected to the motor;
the motor controller configured to control operation of the motor;
an antenna operatively connected to the motor controller;
a power supply electrically connected to the motor;
wherein the power supply includes at least one battery;
a housing;
wherein the motor, the gear reducing assembly and the power supply are positioned within the housing;
a remote control device wirelessly connected to the antenna;
wherein the shade material is movable to a different position by transmitting a wireless signal to the motorized window shade system using the remote control device;
wherein manual movement is detected by a sensor system.

6. A motorized window shade system comprising:
shade material;
the shade material extending a length from an upper end to a lower end;
a DC electric motor;
the shade material operatively connected to the motor such that operation of the motor changes the position of the shade material;
a gear reducing assembly operatively connected to the motor;
a motor controller operatively connected to the motor;
the motor controller configured to control operation of the motor;
an antenna operatively connected to the motor controller;
a power supply electrically connected to the motor;
wherein the power supply includes at least one battery;
a housing;
wherein the motor, the gear reducing assembly and the power supply are positioned within the housing;
a remote control device wirelessly connected to the antenna;
wherein the shade material is movable to a different position by transmitting a wireless signal to the motorized window shade system using the remote control device;
wherein manual movement is detected by measuring a rotation of an output shaft of the motor using a magnetic, an optical or a mechanical encoder.

7. A motorized window shade system comprising:
shade material;
the shade material extending a length from an upper end to a lower end;
a DC electric motor;
the shade material operatively connected to the motor such that operation of the motor changes the position of the shade material;
a gear reducing assembly operatively connected to the motor;
a motor controller operatively connected to the motor;
the motor controller configured to control operation of the motor;

an antenna operatively connected to the motor controller;
a power supply electrically connected to the motor;
wherein the power supply includes at least one battery;
a housing;
wherein the motor, the gear reducing assembly and the power supply are positioned within the housing;
a remote control device wirelessly connected to the antenna;
wherein the shade material is movable to a different position by transmitting a wireless signal to the motorized window shade system using the remote control device;
wherein when manual movement is detected the motor controller tracks the distance moved using a counter.

8. A motorized window shade system comprising:
shade material;
the shade material extending a length from an upper end to a lower end;
a shade tube;
the shade tube having a hollow interior;
the shade material operatively connected to the shade tube;
a DC electric motor;
a motor controller operatively connected to the motor;
a power supply electrically connected to the motor;
wherein the power supply includes at least one battery;
a housing;
wherein the motor, the motor controller and the power supply are positioned within the housing;
wherein the housing is positioned within the hollow interior of the shade tube;
the motor operatively connected to the shade tube such that activation of the motor causes rotation of the shade tube thereby opening or closing the shade material;
an antenna operatively connected to the motor controller;
a remote control device wirelessly connected to the antenna;
wherein the shade is movable to a different position by transmitting a wireless signal to the motorized window shade system using the remote control device;
a counterbalance assembly;
the counterbalance assembly operatively connected to the motorized window shade system;
wherein the counterbalance assembly is configured to provide a counterbalance force.

9. The motorized window shade system of claim 8 wherein the housing is formed in a generally cylindrical or tubular shape.

10. A motorized window shade system comprising:
shade material;
the shade material extending a length from an upper end to a lower end;
a shade tube;
the shade tube having a hollow interior;
the shade material operatively connected to the shade tube;
a DC electric motor;
a motor controller operatively connected to the motor;
a power supply electrically connected to the motor;
wherein the power supply includes at least one battery;
a housing;
wherein the motor, the motor controller and the power supply are positioned within the housing;
wherein the housing is positioned within the hollow interior of the shade tube;
the motor operatively connected to the shade tube such that activation of the motor causes rotation of the shade tube thereby opening or closing the shade material;
an antenna operatively connected to the motor controller;
a remote control device wirelessly connected to the antenna;
wherein the shade is movable to a different position by transmitting a wireless signal to the motorized window shade system using the remote control device;
wherein the shade material is further movable to a different position by a tug, wherein a tug is a manual displacement less than a maximum displacement.

11. A motorized window shade system comprising:
shade material;
the shade material extending a length from an upper end to a lower end;
a shade tube;
the shade tube having a hollow interior;
the shade material operatively connected to the shade tube;
a DC electric motor;
a motor controller operatively connected to the motor;
a power supply electrically connected to the motor;
wherein the power supply includes at least one battery;
a housing;
wherein the motor, the motor controller and the power supply are positioned within the housing;
wherein the housing is positioned within the hollow interior of the shade tube;
the motor operatively connected to the shade tube such that activation of the motor causes rotation of the shade tube thereby opening or closing the shade material;
an antenna operatively connected to the motor controller;
a remote control device wirelessly connected to the antenna;
wherein the shade is movable to a different position by transmitting a wireless signal to the motorized window shade system using the remote control device;
wherein the shade material is further movable to a different position by a manual movement, wherein a manual movement is a manual displacement greater than a maximum displacement.

12. A motorized window shade system comprising:
shade material;
the shade material extending a length from an upper end to a lower end;
a shade tube;
the shade tube having a hollow interior;
the shade material operatively connected to the shade tube;
a DC electric motor;
a motor controller operatively connected to the motor;
a power supply electrically connected to the motor;
wherein the power supply includes at least one battery;
a housing;
wherein the motor, the motor controller and the power supply are positioned within the housing;
wherein the housing is positioned within the hollow interior of the shade tube;
the motor operatively connected to the shade tube such that activation of the motor causes rotation of the shade tube thereby opening or closing the shade material;
an antenna operatively connected to the motor controller;
a remote control device wirelessly connected to the antenna;

wherein the shade is movable to a different position by transmitting a wireless signal to the motorized window shade system using the remote control device;
wherein manual movement is detected by a sensor.

13. A motorized window shade system comprising:
shade material;
the shade material extending a length from an upper end to a lower end;
a shade tube;
the shade tube having a hollow interior;
the shade material operatively connected to the shade tube;
a DC electric motor;
a motor controller operatively connected to the motor;
a power supply electrically connected to the motor;
wherein the power supply includes at least one battery;
a housing;
wherein the motor, the motor controller and the power supply are positioned within the housing;
wherein the housing is positioned within the hollow interior of the shade tube;
the motor operatively connected to the shade tube such that activation of the motor causes rotation of the shade tube thereby opening or closing the shade material;
an antenna operatively connected to the motor controller;
a remote control device wirelessly connected to the antenna;
wherein the shade is movable to a different position by transmitting a wireless signal to the motorized window shade system using the remote control device;
wherein manual movement is detected by measuring a rotation of an output shaft of the motor using a magnetic, an optical or a mechanical encoder.

14. A motorized window shade system comprising:
shade material;
the shade material extending a length from an upper end to a lower end;
a shade tube;
the shade tube having a hollow interior;
the shade material operatively connected to the shade tube;
a DC electric motor;
a motor controller operatively connected to the motor;
a power supply electrically connected to the motor;
wherein the power supply includes at least one battery;
a housing;
wherein the motor, the motor controller and the power supply are positioned within the housing;
wherein the housing is positioned within the hollow interior of the shade tube;
the motor operatively connected to the shade tube such that activation of the motor causes rotation of the shade tube thereby opening or closing the shade material;
an antenna operatively connected to the motor controller;
a remote control device wirelessly connected to the antenna;
wherein the shade is movable to a different position by transmitting a wireless signal to the motorized window shade system using the remote control device;
wherein when manual movement is detected the motor controller tracks the distance moved using a counter.

15. A motorized window shade system comprising:
shade material;
the shade material extending a length from an upper end to a lower end;
a motor;
the motor operatively connected to shade material such that activation of the motor causes movement of the shade material;
a motor controller operatively connected to the motor;
a power supply electrically connected to the motor;
wherein the power supply includes at least one battery;
a housing;
wherein the motor, the motor controller and the power supply are positioned within the housing;
an antenna operatively connected to the motor controller;
a remote control device wirelessly connected to the antenna;
wherein the shade is movable to a different position by motorized movement of the shade through operation of the motor; and
wherein when the shade is moved by motorized movement a sensor system detects the movement and a counter tracks the movement;
a counterbalance assembly;
the counterbalance assembly operatively connected to the motorized window shade system;
wherein the counterbalance assembly is configured to provide a counterbalance force.

16. The motorized window shade system of claim 15 wherein the housing is formed in a generally cylindrical or tubular shape and the housing is positioned within a hollow interior of a roller tube of a roller shade.

17. A motorized window shade system comprising:
shade material;
the shade material extending a length from an upper end to a lower end;
a motor;
the motor operatively connected to shade material such that activation of the motor causes movement of the shade material;
a motor controller operatively connected to the motor;
a power supply electrically connected to the motor;
wherein the power supply includes at least one battery;
a housing;
wherein the motor, the motor controller and the power supply are positioned within the housing;
an antenna operatively connected to the motor controller;
a remote control device wirelessly connected to the antenna;
wherein the shade is movable to a different position by motorized movement of the shade through operation of the motor;
wherein when the shade is moved by motorized movement a sensor system detects the movement and a counter tracks the movement;
wherein the sensor system includes at least one Hall Effect sensor.

18. A motorized window shade system comprising:
shade material;
the shade material extending a length from an upper end to a lower end;
a motor;
the motor operatively connected to shade material such that activation of the motor causes movement of the shade material;
a motor controller operatively connected to the motor;
a power supply electrically connected to the motor;
wherein the power supply includes at least one battery;
a housing;
wherein the motor, the motor controller and the power supply are positioned within the housing;
an antenna operatively connected to the motor controller;

a remote control device wirelessly connected to the antenna;
wherein the shade is movable to a different position by motorized movement of the shade through operation of the motor;
wherein when the shade is moved by motorized movement a sensor system detects the movement and a counter tracks the movement;
wherein the sensor system includes a multi-pole magnet connected to a rotatable shaft of the motor.

19. A motorized window shade system comprising:
shade material;
the shade material extending a length from an upper end to a lower end;
a motor;
the motor operatively connected to shade material such that activation of the motor causes movement of the shade material;
a motor controller operatively connected to the motor;
a power supply electrically connected to the motor;
wherein the power supply includes at least one battery;
a housing;
wherein the motor, the motor controller and the power supply are positioned within the housing;
an antenna operatively connected to the motor controller;
a remote control device wirelessly connected to the antenna;
wherein the shade is movable to a different position by motorized movement of the shade through operation of the motor;
wherein when the shade is moved by motorized movement a sensor system detects the movement and a counter tracks the movement;
wherein the shade material is further movable to a different position by a tug, wherein a tug is a manual displacement less than a predetermined maximum displacement.

20. A motorized window shade system comprising:
shade material;
the shade material extending a length from an upper end to a lower end;
a motor;
the motor operatively connected to shade material such that activation of the motor causes movement of the shade material;
a motor controller operatively connected to the motor;
a power supply electrically connected to the motor;
wherein the power supply includes at least one battery;
a housing;
wherein the motor, the motor controller and the power supply are positioned within the housing;
an antenna operatively connected to the motor controller;
a remote control device wirelessly connected to the antenna;
wherein the shade is movable to a different position by motorized movement of the shade through operation of the motor;
wherein when the shade is moved by motorized movement a sensor system detects the movement and a counter tracks the movement;
wherein the shade material is further movable to a different position by a manual movement, wherein a manual movement is a manual displacement greater than a predetermined maximum displacement.

21. A motorized window shade system comprising:
shade material;
the shade material extending a length from an upper end to a lower end;
a motor;
the motor operatively connected to shade material such that activation of the motor causes movement of the shade material;
a motor controller operatively connected to the motor;
a power supply electrically connected to the motor;
wherein the power supply includes at least one battery;
a housing;
wherein the motor, the motor controller and the power supply are positioned within the housing;
an antenna operatively connected to the motor controller;
a remote control device wirelessly connected to the antenna;
wherein the shade is movable to a different position by motorized movement of the shade through operation of the motor;
wherein when the shade is moved by motorized movement a sensor system detects the movement and a counter tracks the movement;
wherein manual movement is detected by measuring a rotation of an output shaft of the motor using a magnetic, an optical or a mechanical encoder.

* * * * *